(12) United States Patent
Kato

(10) Patent No.: US 6,351,826 B1
(45) Date of Patent: Feb. 26, 2002

(54) METHOD AND APPARATUS FOR AUTOMATICALLY VERIFYING COMMUNICATION SOFTWARE

(75) Inventor: Naomoto Kato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/207,337

(22) Filed: Dec. 8, 1998

(30) Foreign Application Priority Data

Dec. 8, 1997 (JP) .............................................. 9-356288

(51) Int. Cl.[7] .......................... G06F 11/36; H04L 29/14
(52) U.S. Cl. ............................................. 714/38; 717/1
(58) Field of Search ............................... 714/38; 717/1, 717/4, 11; 716/4; 703/22; 379/10, 27; 709/220; 370/250

(56) References Cited

U.S. PATENT DOCUMENTS 5,703,788 A * 12/1997 Shei et al.
5,809,108 A * 9/1998 Thompson et al.
6,023,586 A * 2/2000 Gaisford et al.
6,067,639 A * 5/2000 Rodrigues et al.

OTHER PUBLICATIONS

"Cross Test Support System of Communication Software" Tomoyasu Suzuki et al., pp. 5–187 to 5–188, Information Processing Society of Japan, National Convention, Sep. 20–22, 1996.

* cited by examiner

Primary Examiner—Gopal C. Ray
(74) Attorney, Agent, or Firm—Venable; Robert J. Frank; Michael A. Sartori

(57) ABSTRACT

An automatic verification apparatus and method for communication software can automatically verify the result of a regression test without manually operating a terminal for the regression test, which results in the improved efficiency of the test operation. An automatic verification apparatus for communication software comprises a virtual terminal manager for performing a pseudo-operation of a terminal connector, one or more virtual terminals, each performing a pseudo-operation of a terminal, a scenario recording unit for recording the pseudo-operation performed by each virtual terminal as a scenario, a scenario executing unit for automatically executing the recorded pseudo-operation of the terminal, and a scenario verification unit for automatically verifying if the result of the automatic execution is correct whenever the recorded pseudo-operation of the terminal is automatically executed.

13 Claims, 23 Drawing Sheets (a)

(b)

(a)

(b)

(a)

(b)

(a)

(b)

METHOD AND APPARATUS FOR AUTOMATICALLY VERIFYING COMMUNICATION SOFTWARE

BACKGROUND OF THE INVENTION

1. Field of Invention

This invention relates to an apparatus and method for automatically verifying communication software, and more particularly, to an automatic verification apparatus and method which can automatically execute a regression test for communication software.

2. Description of the Related Art

FIG. 26 schematically illustrates a conventional communication system 200. The communication system 200 has a CPU 210, a plurality of terminal connectors 220, and a communication software 230, as major elements. Each of the terminal connectors 220 converts electric signals transmitted to and from the associated terminal 240 into digital signals, and supplies the digital signals to the CPU 210. The CPU controls each terminal 240 according to the communication software 230. Two or more terminal connectors 220 are connected to a common CPU 210. The number of the terminal connectors 220 is determined depending on the type and the number of the terminals 240 connected to the terminal connectors 220.

In developing a communication system, it is common to modify the existing system by, for example, adding a new function, rather than to develop a totally new system. Whenever the existing functions are modified, or new functions are added to the existing functions are modified, or new functions are added to the existing communication software, it is essential to verify or recheck the items or elements which were already tested in the original software. For example, the communication system 200 illustrated in FIG. 26 was already subjected to a test A for operating each terminal 240 with a procedure A. If the communication software 230 is modified, it must be verified if the modified communication system 200 correctly operates with the procedure A, with which the pre-modified system 200 operates. Therefore, each terminal 240 must be test-operated with the same procedure A in order to reconfirm that the improved communication system 200 operates correctly. The process for verifying the operation result is called a "regression test". The efficiency of the development of a communication system greatly depends on how efficiently the regression test is performed.

There are some problems in the conventional process for developing a communication system (including hardware). These problems may adversely affect the efficiency of the regression test. One major problem is that the modified communication software can not be tested unless there is a communication hardware in the test environment. Another problem is that the test is performed only in the vicinity of the hardware. Therefore, there is a strong demand for a technique which allows the communication software to be tested without hardware, or to be tested from a remote place via networks.

In addition, since it is inefficient to manually repeat the same test operation for each terminal every time a modification is made to the existing communication system, a demand for a technique for automatically repeating the test operation for each terminal has also arisen.

SUMMARY OF THE INVENTION

Therefore, it is an object of the invention to provide an automatic verification apparatus which can automatically execute a regression test for communication software. The automatic verification apparatus comprises a virtual terminal manager for performing a pseudo-operation of a terminal connector, a virtual terminal performing a pseudo-operation of a terminal, a scenario recording unit for recording the pseudo-operation performed by the virtual terminal as a scenario, a scenario executing unit for automatically executing the recorded pseudo-operation of the terminal, and a scenario verification unit for automatically verifying if the result of the automatic execution is correct whenever the recorded pseudo-operation of the terminal is automatically executed.

DETAILED DESCRIPTION OF THE PREFERRED EMBODIMENT

The preferred embodiments of an automatic verification apparatus and method for a communication software according to the invention will now be described with reference to the attached drawings.

First, the functional structure of the automatic verification apparatus for a communication software according to an embodiment will be explained. The automatic verification apparatus comprises (1) a functional element for performing a pseudo-operation of a terminal connector, (2) a functional element for performing a pseudo-operation of a terminal, (3) a functional element for recording the pseudo-operation performed by the virtual terminal as a scenario, (4) a functional element for automatically executing the recorded pseudo-operation of the terminal, and (5) a functional element for automatically verifying if the automatic execution result is correct whenever the recorded pseudo-operation of the terminal is automatically executed. In this specification, a pseudo terminal connector is referred to as a "virtual terminal manager", a pseudo terminal is referred to as a "virtual terminal", and a file in which the operation of the virtual terminal is recorded is referred to as a "scenario".

Next, the actual hardware and software structures representing the above-described functional elements of the automatic verification apparatus 100 for a communication software will be explained with reference to FIGS. 1 through 5.

Figure 1:
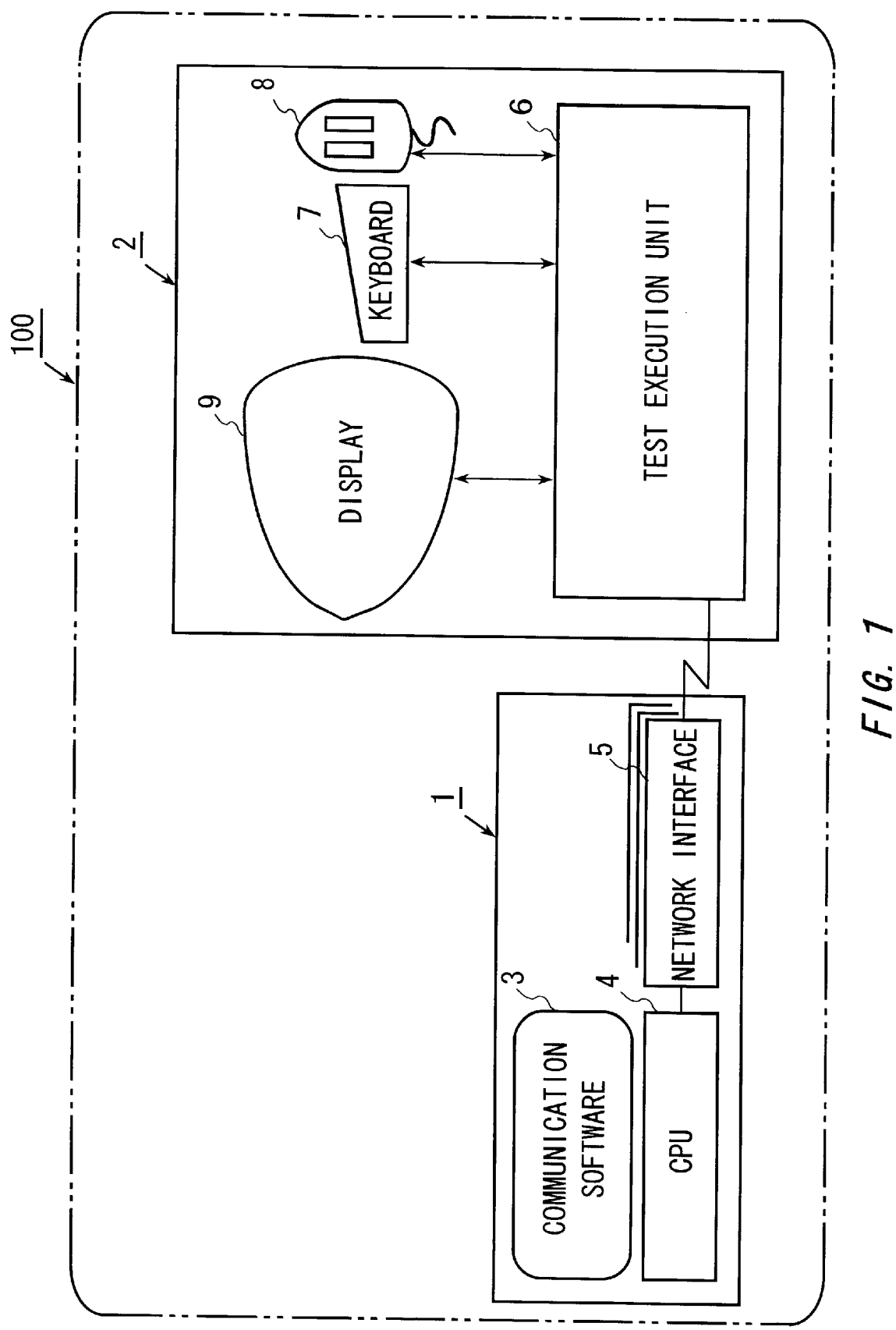
FIG. 1 is a block diagram for an automatic verification apparatus for communication software.

FIG. 1 illustrates the automatic verification apparatus 100 according to an embodiment of the invention.

This automatic verification apparatus 100 has two major parts, a test object communication apparatus 1 and a test execution apparatus 2. The test object communication apparatus 1 and the test execution apparatus 2 are connected to each other via the network interface 5 provided to the apparatus 1 and the network interface provided to the test execution unit 6 in the apparatus 2.

Figure 26:
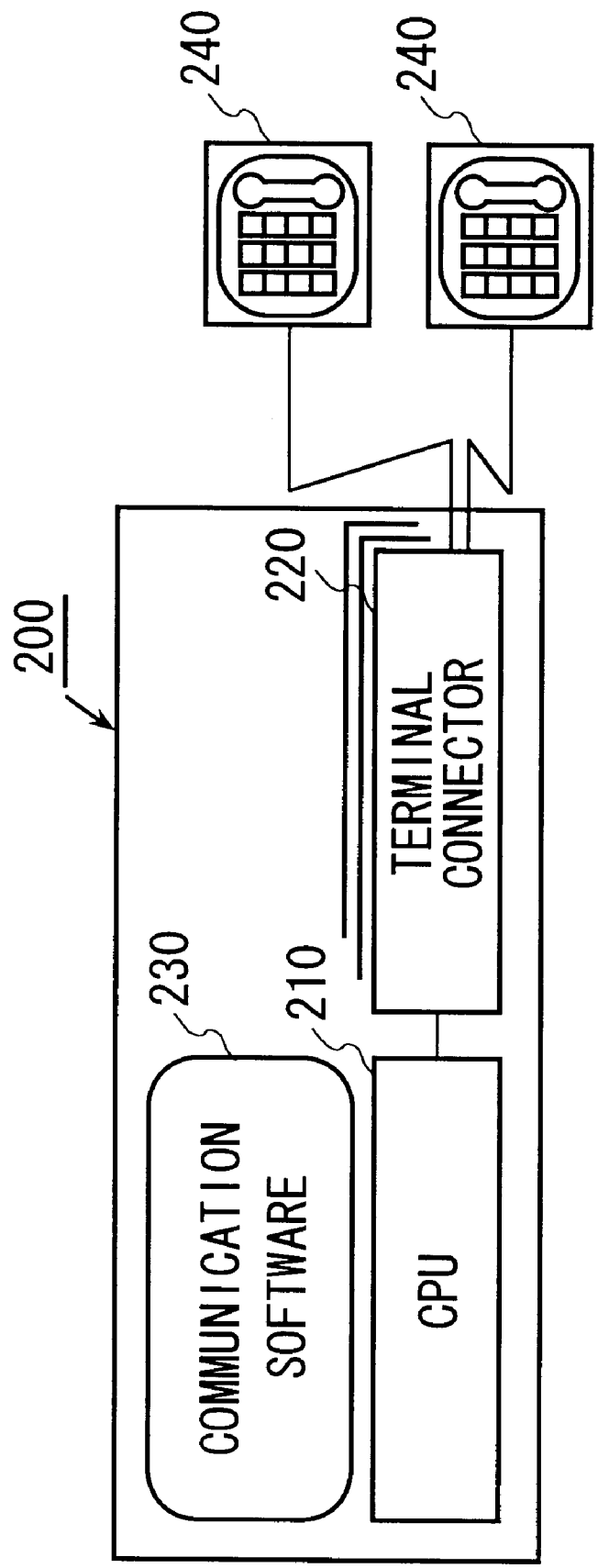
FIG. 26 illustrates a conventional communication apparatus.

The test object communication apparatus 1 comprises communication software 3, a CPU 4 for controlling the communication software 3, and a network interface 5 which functions as an input/output unit to and from the test execution apparatus 2. This test object communication apparatus 1 is similar to the conventional communication apparatus 200 illustrated in FIG. 26, but the terminal connector 220 of the conventional communication apparatus 200 is replaced by the network interface 5. The object of the test communication apparatus 1 is the communication software 3. The terminal connector 220 shown in FIG. 26 is not the test object in this invention, the communication software 3 can be correctly tested even if the terminal connector, which is the actual hardware, is not connected to the test object communication apparatus 1.

The test execution apparatus 2 comprises a test execution unit 6, an input unit consisting of a keyboard 7 and a mouse 8, through which an operator can externally operate the apparatus 2, and display 9 for displaying the contents of the operation input through the keyboard 7 and the mouse 8. The keyboard 7, the mouse 8, and the display 9 are commercially available, and the structures of these elements are known. Therefore, explanation for these elements is omitted.

The test execution unit 6 is essential for the automatic verification apparatus 100.

Figure 2:
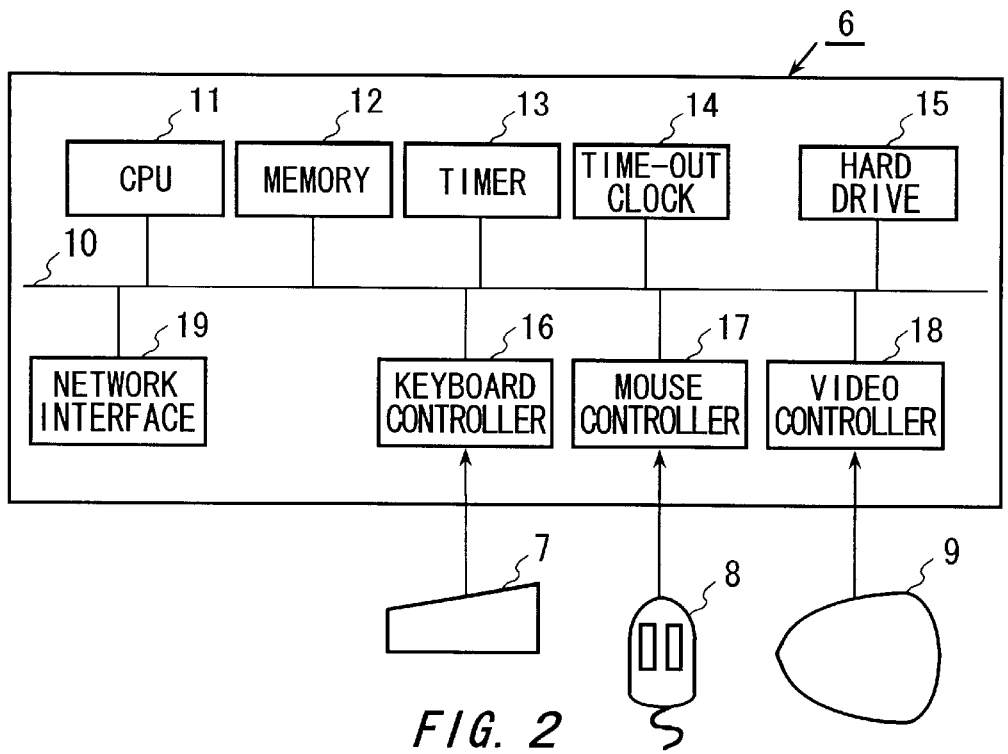
FIG. 2 is a block diagram of the test execution unit shown in FIG. 1.

FIG. 2 illustrates the structure of the test execution unit 6. In the test execution unit 6, a CPU 11 for processing data, a memory 12 for storing data, a timer 13 for counting processing time, a time-out clock 14, a hard drive 15 for storing a large volume of data, a keyboard controller 16 for controlling the keyboard 7, a mouse controller 17 for controlling the mouse 8, a video controller 18 for controlling the display 9, and a network interface 19, which functions as an input/output unit to and from the test object communication apparatus 1, are mutually connected via a data-transfer bus 10.

The elements other than the memory 12 and the hard drive 15 are commercially available, and known to those skilled in the art. The software structure stored in the memory 12, and the file structure stored in the hard drive 15 are essential for the automatic verification apparatus 100, the details of which will be described below.

Figure 3:
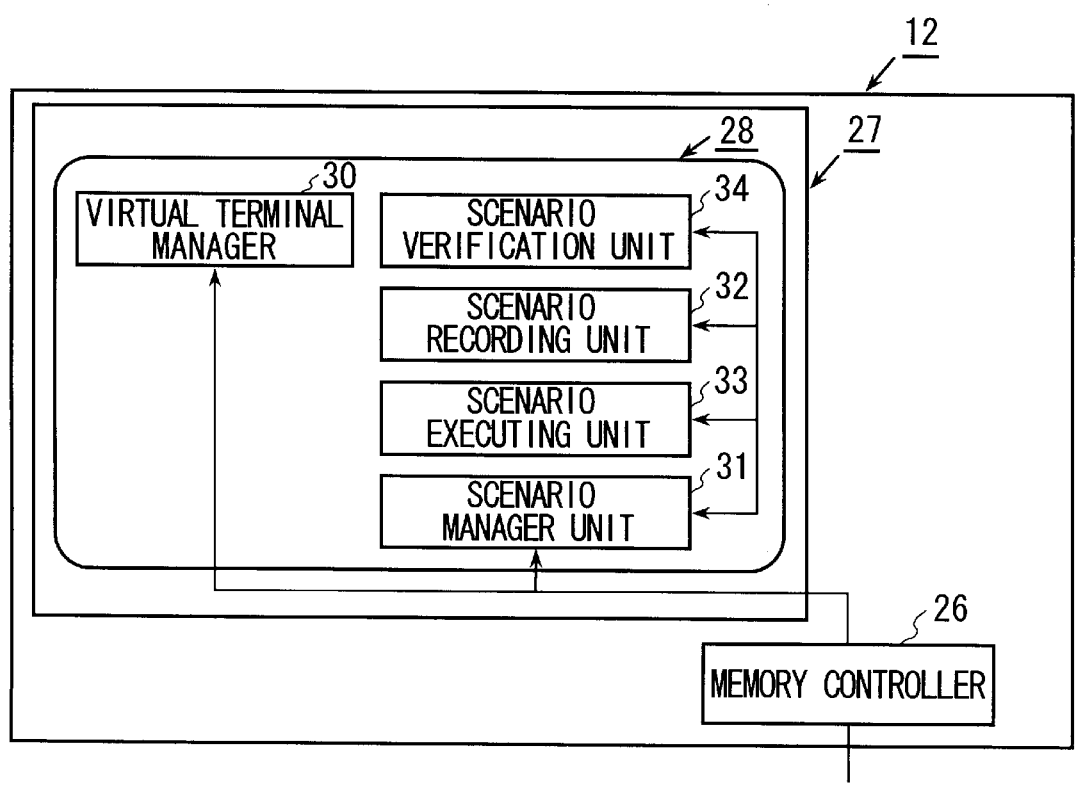
FIG. 3 is a block diagram of the memory shown in FIG. 2.

FIG. 3 illustrates the structure of the memory 12. The memory 12 comprises a memory device 27 which stores test execution software 28, and a commercially available memory controller 26 for controlling the memory device 27. The memory device 27 and the test execution software 28 stored in the memory device 27 are essential for the automatic verification apparatus 100 for communication software.

Figure 4:
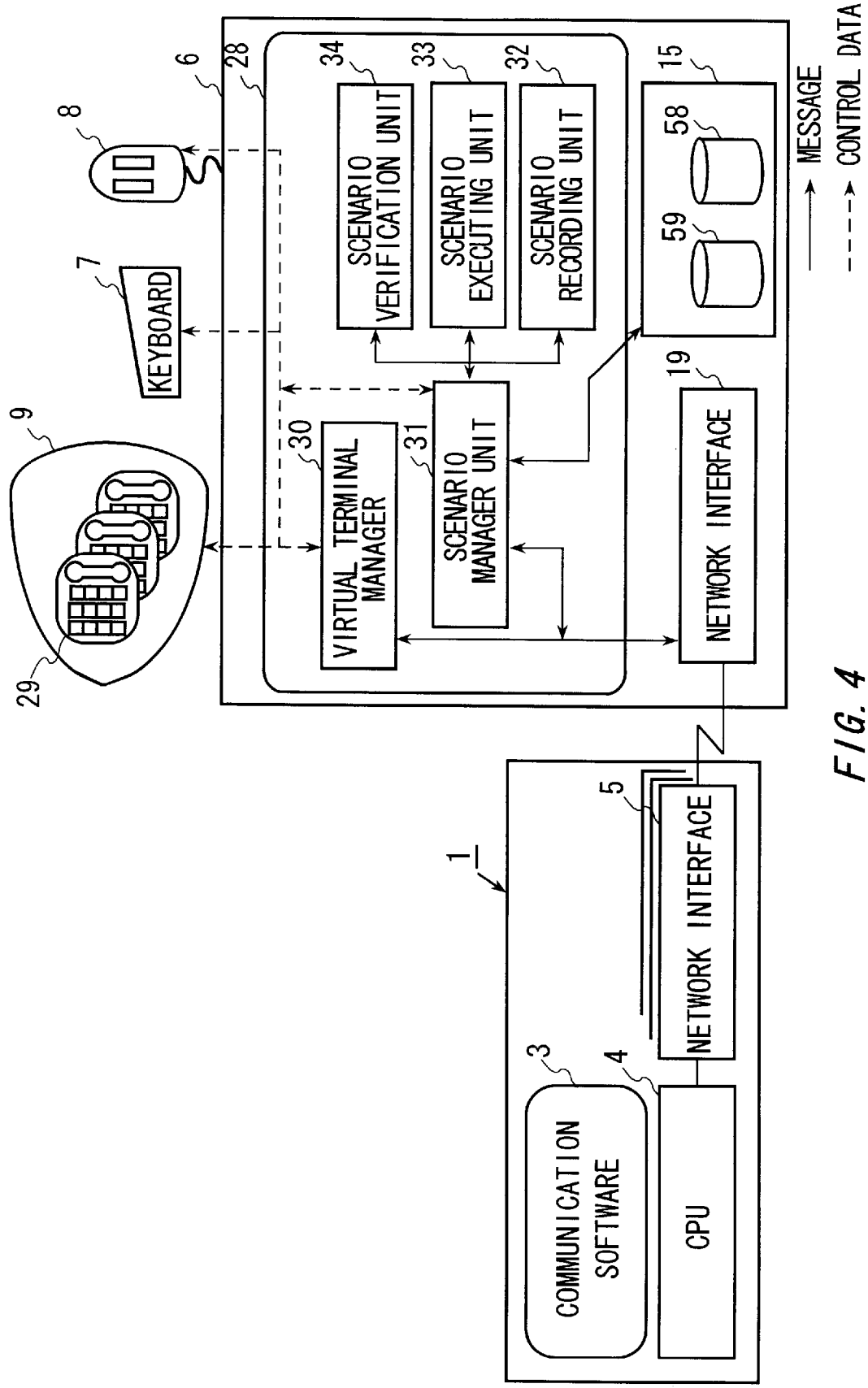
FIG. 4 illustrates the structure of the software of the test execution unit.

FIG. 4 shows the structure of the test execution software 28, which has a virtual terminal manager 30, which is a pseudo terminal connector formed for a test, and a scenario manager 31 for managing operation scenarios of the virtual terminal. The scenario manager 31 also manages a scenario recording unit 32 for recording scenarios, scenario executing unit 33 for executing the scenario, and a scenario verification unit 34 for verifying the scenario. The scenario manager 31 can access the hard drive 15 if it is necessary.

Figure 5:
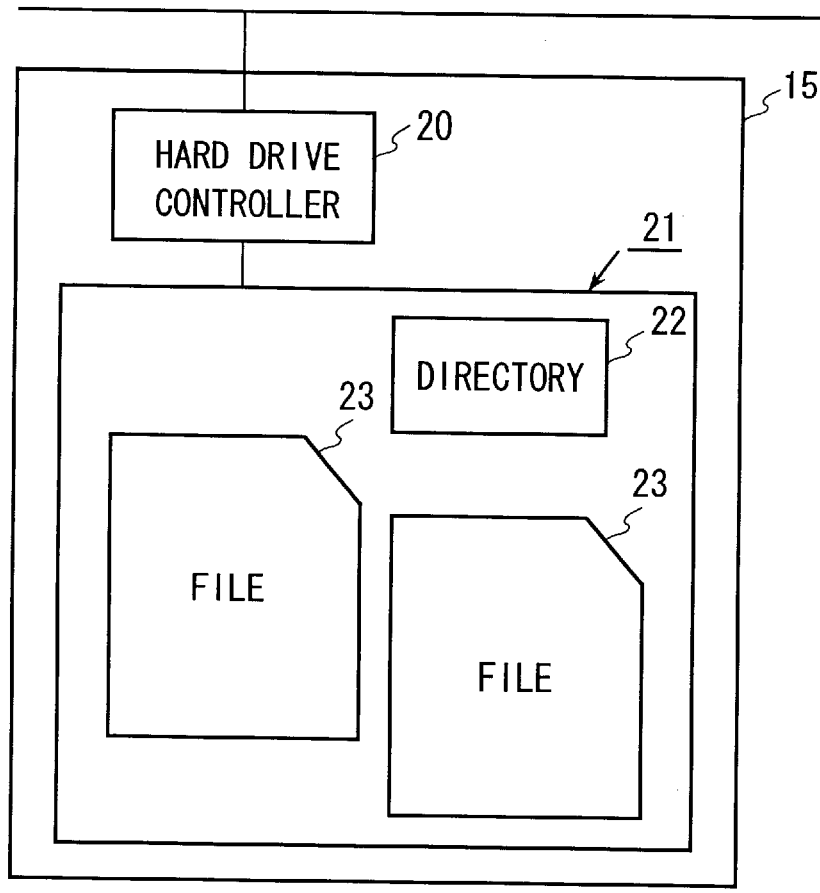
FIG. 5 is a block diagram of the hard drive.

FIG. 5 shows the structure of the hard drive 15. The hard drive 15 comprises a hard drive controller 20 and a hard drive medium 21. The hard drive medium 21 stores a directory 22, and a plurality of files 23. These files 23 stored in the hard drive medium 21 can be identified by their unique names. The list of the file names is registered in the directory 22. The CPU 11 can access each of the files 23, via the bus 10 and the hard drive controller 20, by identifying the file name. It is also possible to read out and write the data from and into each file by byte, as well as to execute ordinary file manipulation, such as file creation or deletion. Each file 23 consists of a message group file 58 for storing data as to the message groups, the details of which will be described below, and a scenario file 59 for storing data as to the scenarios.

In FIG. 4, the solid lines and the broken lines connected among the virtual terminal manager 30, the scenario manager 31, the scenario recording unit 32, and the scenario verification unit 34 indicate the data flow. The data transferred along the solid lines are "messages", which are communicated from the test object communication unit 1 via the network interface 19. The data transferred along the broken lines are "control data", which are communicated among the display 9, the keyboard 7, and the mouse 8 in order to control the virtual terminal manager 30 and the scenario manager 31. The display 9 displays an operation panel (for example, a virtual terminal 29) for operating the virtual terminal manager 30 and the scenario manager 31. The operator can transmit control data for controlling the virtual terminal manager 30 and the scenario manager 31 to the bus 10 using the keyboard 7 and the mouse 8, while referring to the operation panel displayed on the display 9.

Figure 6:
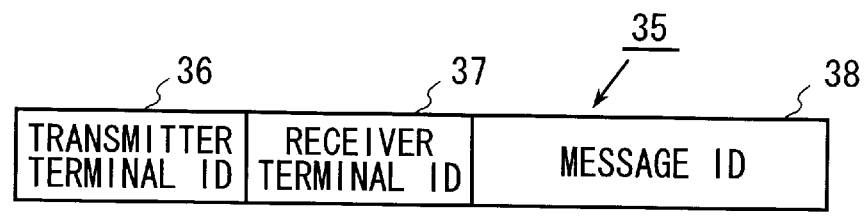
FIG. 6(a) illustrates a typical message structure.
FIG. 6(b) illustrates a verification message.
Figure 6:
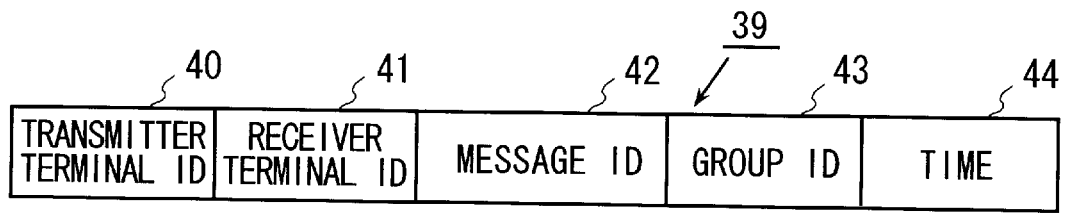

FIG. 6 shows the structure of the "message" communicated between the communication software 3 and the virtual terminal manager 30. There are two major types of messages, an ordinary message and a verification message. FIG. 6(a) shows the structure of the ordinary message 35, and FIG. 6(b) shows the structure of the verification message 39.

The ordinary message 35 consists of a transmitter terminal ID 36, a receiver terminal ID 37, and a message ID 38, as shown in FIG. 6(a). If a scenario is recorded by the scenario recording unit 32, the message 35 is recorded in the format of the verification message 39. This will be explained below. A verification message 39 includes a transmitter terminal ID 40, a receiver terminal ID 41, a message ID 42, a group ID 43, and time 44, as shown in FIG. 6(b). Thus, the verification message 39 has a group ID 43 and time 44, in addition to the contents of the ordinary data 35.

Figure 7:
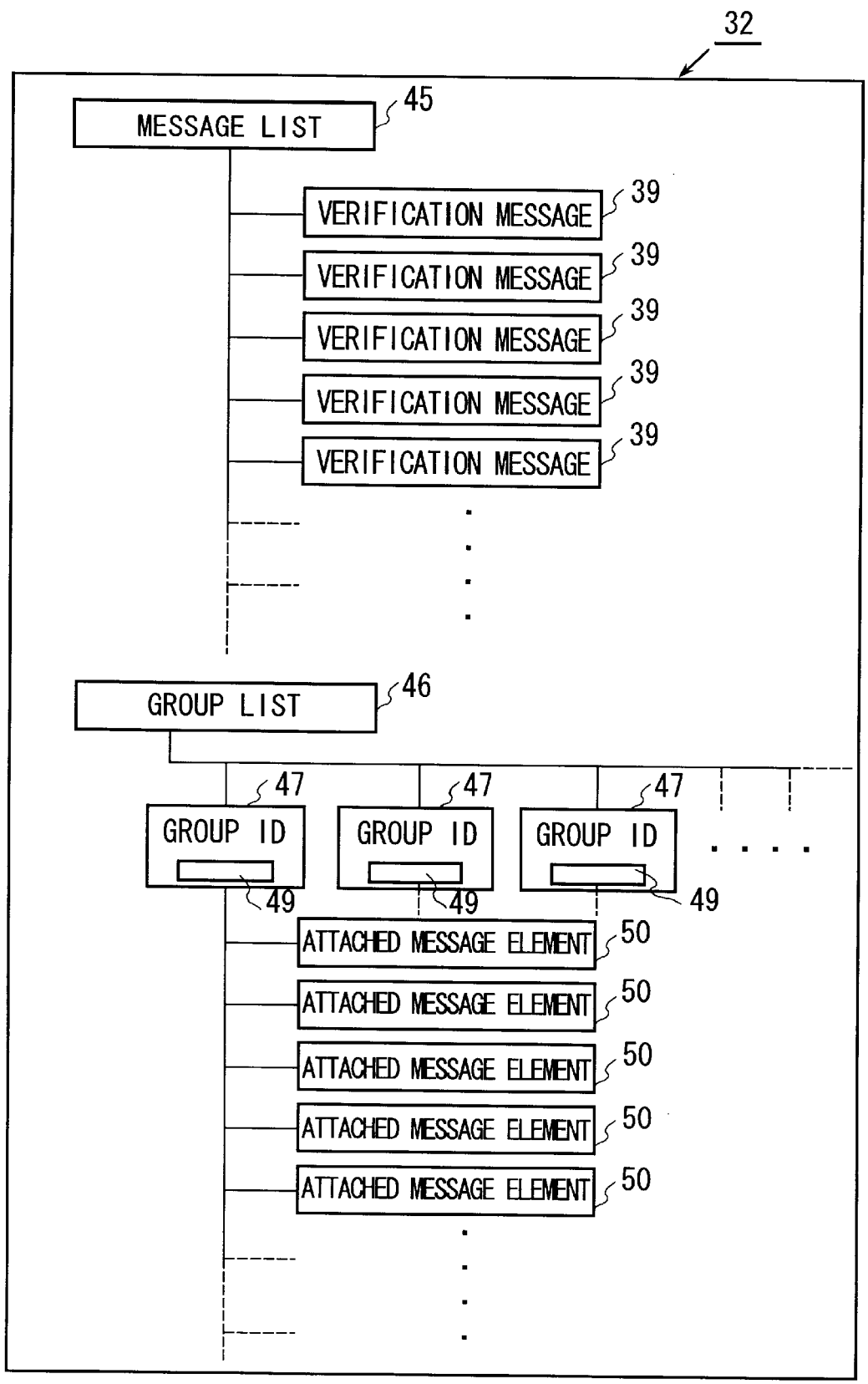
FIG. 7 illustrates the structure of a scenario recording unit.
Figure 8:
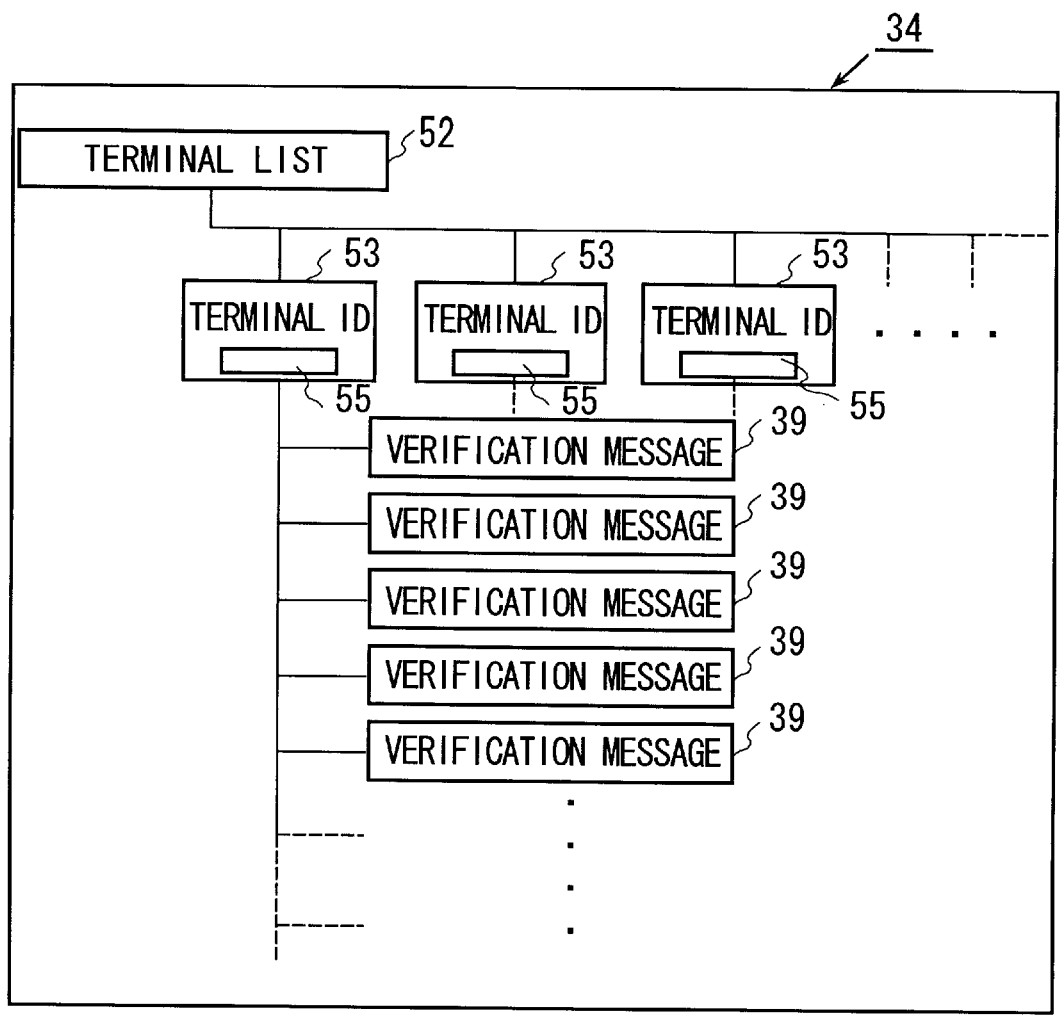
FIG. 8 illustrates the structure of a scenario verification unit.
Figure 9:
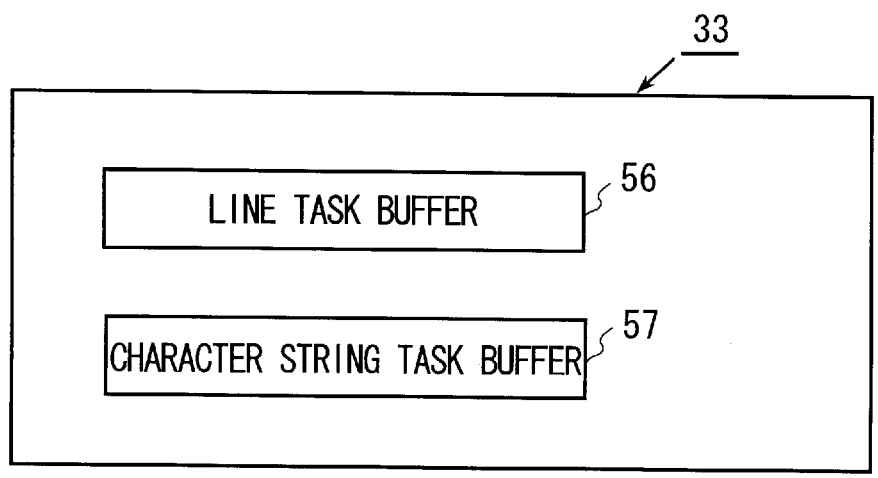
FIG. 9 the structure of a scenario executing unit.

FIGS. 7 through 9 show the structures of the scenario recording unit 32, the scenario verification unit 34, and the scenario executing unit 33, respectively, which are all administrated by scenario manager 31 of the test execution software 28.

As shown in FIG. 7, the scenario recording unit 32 has a message list 45 and a group list 46. The message list 45 includes a plurality of verification messages 39, which are arranged in chronological order. Therefore, the newest message 35 which was communicated most recently, is recorded in the form of a verification message 39 placed last in the list.

The group list 46 includes a plurality of group-list elements 47, each group-list element consisting of a plurality of attached message elements 50 which are recorded in the corresponding attached message list 49. Each group-list element 47 can store a group name or group ID. Similarly, each attached message element 50 can have a message name or message ID. These group-list elements 47 and the attached message elements 50 are arranged in chronological order. That is, the newest message 35, which was communicated most recently, is added to the last of the group-list elements 47 and the attached message elements 50.

FIG. 8 shows the structure of the scenario verification unit 34. The scenario verification unit 34 has a terminal list 52. The terminal list 52 includes a plurality of terminal-list elements 53, each corresponding to one of the terminals. Each terminal-list element 53 includes a plurality of verification messages 39 which are managed by the message list 55 provided to each terminal-list element 53. Each terminal-list element 53 can store the terminal ID. Both the terminal-list elements 53 and the verification messages 39 are arranged in chronological order, and the newest message 35 is added to the end of the message list, as a verification message 39, for each terminal-list element 53.

FIG. 9 shows the structure of the scenario executing unit 33. The scenario executing unit 33 has a line task buffer 56 and a character string task buffer 57. The line task buffer 56 can store a line of a message group of the message group file 58, and the character string task buffer 57 can store a character string of the message group.

The structure of the test execution software 28 applicable to the automatic verification apparatus 100 for communication software according to the invention has been described above. The operations of the test execution software 28 will now be explained.

Figure 10:
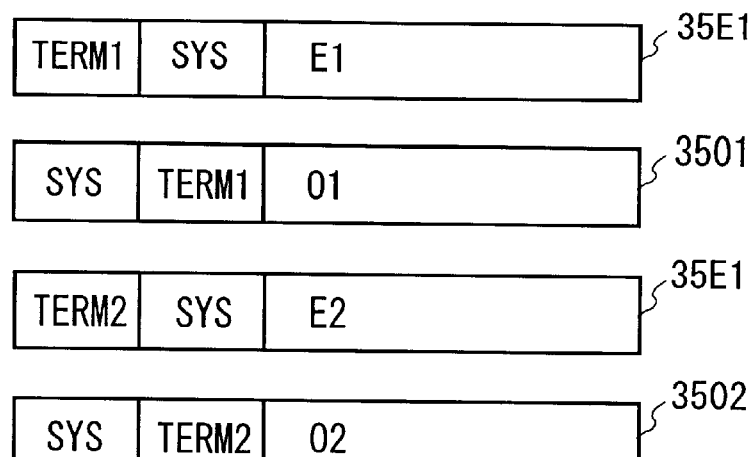
FIG. 10(a) illustrates a message structure.
FIG. 10(b) is a sequence diagram showing the sequence of the message shown in FIG. 10(a) in time series.
Figure 10:
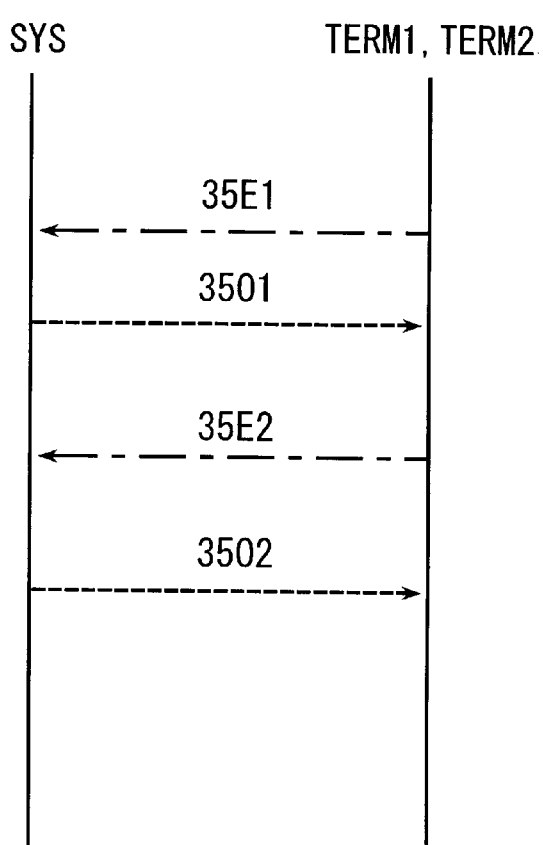

First, the message sequence is explained with reference to FIG. 10. FIG. 10(a) illustrates the detailed structure of the message 35 shown in FIG. 6(a). The messages 35E1, 35O1, 35E1, and 35O2 are transferred between the virtual terminal manager 30 and the communication software 3 via the network interface 5 of the test object communication unit 1 and the network interface 19 of the test execution unit 6. FIG. 10(b) shows the message flow of these messages 35E1, 35O1, 35E1, and 35O2 in time series. In this specification, the message flow depicted in time series, as in FIG. 10(b), is called a "message sequence".

FIG. 10(a) shows four messages 35E1, 35O1, 35E2, and 35O2. The message flows of these four messages are depicted in chronological order, and the latest message flow between the communication software 3 and the virtual terminal manager 30 is positioned at the bottom of the sequence.

The first message 35E1 is transmitted from "Term1", which is one of the virtual terminals 29 belonging to the virtual terminal manager 30, to the communication software 3, which is the receiving terminal indicated as "SYS" in FIG. 10(b), via the network interfaces 19 and 5. In this specification, the message transmitted from the virtual terminal manager 30 to the communication software 3 is called an "event", and the notation "E1" denotes the first event.

The second message 35O1 is transmitted from the communication software 3, which is the receiving terminal indicated as "SYS", to "Term1", which is one of the virtual terminals 29 belonging to the virtual terminal manager 30, via the network interfaces 5 and 19. In this specification, the message transmitted from the communication software 3 to the virtual terminal manager 30 is called an "order", and the notation "O1" denotes the first order.

The third message 35E2 is a message for transmitting an event E2 from "Term2", which is one of the virtual terminals 29 belonging to the virtual terminal manager 30, to the communication software 3, which is the receiving terminal indicated as "SYS", via the network interfaces 19 and 5.

The fourth message 35O2 is a message for transmitting an order O2 from the communication software 3, which is the receiving terminal indicated as "SYS", to "Term2", which is one of the virtual terminals 29 belonging to the virtual terminal manager 30, via the network interfaces 5 and 19.

In FIG. 10(b), the vertical lines are time axes, and the horizontal message flows are indicated as arrows. As is clear from the message sequence of FIG. 10(b), event E1 is transmitted as the message 35E1 from the virtual terminal Term1 to the communication software 3 ("SYS"), then order O1 is transmitted as the message 35O1 from the communication software 3 ("SYS") to the virtual terminal Term1. Then, event E2 is transmitted as the message 35E2 from the virtual terminal Term2 to the communication software 3 ("SYS"), and finally, order O2 is transmitted as the message 35O2 from the communication software 3 ("SYS") to the virtual terminal Term2.

Next, each of the elements of the automatic verification unit for communication software according to an embodiment of the invention will be described in detail. The elements are essentially (1) a functional element for performing a pseudo-operation of a terminal connector, (2) a functional element for performing a pseudo-operation of a terminal, (3) a functional element for recording the pseudo-operation performed by the virtual terminal as a scenario, (4) a functional element for automatically executing the recorded pseudo-operation of the terminal, and (5) a functional element for automatically verifying if the automatic execution result is correct whenever the recorded pseudo-operation of the terminal is automatically executed.

The functional element for performing a pseudo-operation of a terminal connector is embodied as a virtual terminal manager 30 of the test execution software 28. The functional element for performing a pseudo-operation of a terminal is embodied as a virtual terminal 29. The functional element for recording the pseudo-operation of the virtual terminal is embodied as group data preparation procedure and scenario recording procedure executed by the scenario manager 31 and the scenario recording unit 32. The functional elements (4) and (5) are simultaneously embodied as a verification preparation procedure and a message verification procedure executed by the scenario manager 31, the scenario executing unit 33, and the scenario verification unit 34.

Figure 11:
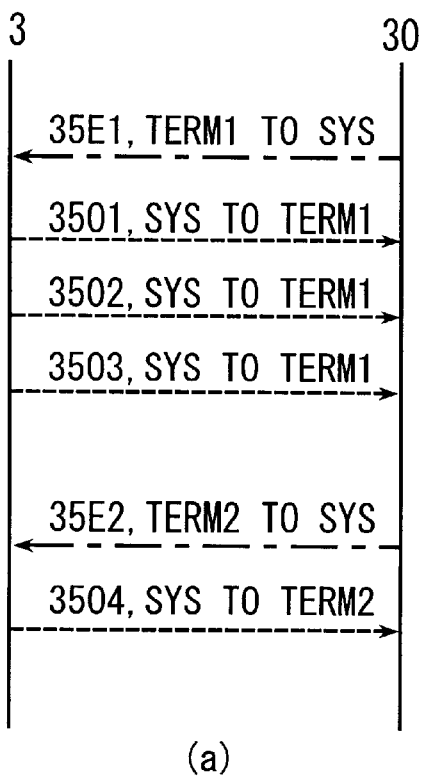
FIG. 11(a) illustrates a message sequence recorded as a correct message order for executing a test.
FIG. 11(b) illustrates a message sequence of the execution result of an automatic verification.
Figure 11:
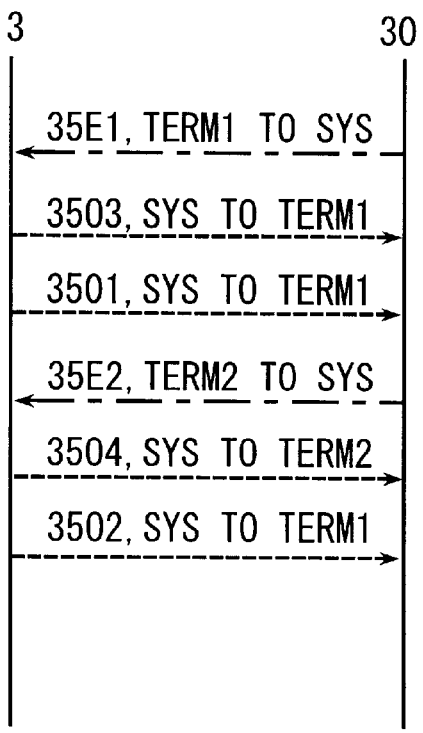

FIG. 11(a) shows a message sequence recorded as a correct message sequence for performing a regression test, and FIG. 11(b) shows the actual test result.

In FIG. 11(a), the first message 35E1 is an event E1 transmitted from "Term1", which is one of the virtual terminals 29 belonging to the virtual terminal manager 30, to the communication software 3 ("SYS,") via the network interfaces 19 and 5.

The second message 35O1 is an order O1 transmitted from the communication software 3 ("SYS") to "Term1", which is one of the virtual terminals 29 belonging to the virtual terminal manager 30, via the network interfaces 5 and 19. The third message 35O2 is an order O2 transmitted from the communication software 3 ("SYS") to "Term1", which is one of the virtual terminals 29 belonging to the virtual terminal manager 30, via the network interfaces 5 and 19.

The fourth message 35O3 is an order O3 transmitted from the communication software 3 ("SYS") to "Term1", which is one of the virtual terminals 29 belonging to the virtual terminal manager 30, via the network interfaces 5 and 19.

The fifth message 35E2 is an event E1 transmitted from "Term2", which is one of the virtual terminals 29 belonging to the virtual terminal manager 30, to the communication software 3 ("SYS"), via the network interfaces 19 and 5.

The sixth message 35O4 is an order O4 transmitted from the communication software 3 ("SYS") to "Term2", which is one of the virtual terminals 29 belonging to the virtual terminal manager 30, via the network interfaces 5 and 19.

FIG. 11(b) shows the message sequence of the test result of the automatic verification. If the messages 35E1 and 35E2 are transmitted to the communication software 3 at the same timings as those of the scenarios recorded in the scenario file 59, the order of the messages becomes the message sequence shown in FIG. 11(b), and this result is determined to be a correct verification result. The reason for it will be explained below.

With the present invention, in order to obtain the determination that "the verification result is correct" from the message sequence shown in FIG. 11(b), a certain scenario verification procedure must be followed. The prerequisites of the scenario verification procedure are as follows: (a) The transmission terminal ID and the receiving terminal ID are specified; (b) The message ID is specified; and (c) The group ID is specified. As has been described, "SYS" denotes the communication software 3, and if a message is transmitted from a virtual terminal to the "SYS", one or more messages are transmitted to the terminal from the "SYS".

The scenario verification procedure comprises the following four procedures.
(1) Group data preparation procedure;
(2) Scenario recording procedure;
(3) Verification preparation procedure; and
(4) Message verification procedure.

It must be noted that when automatically verifying the execution result of the scenario, it cannot be verified only based on if the message sequence recorded in the scenario is the same as the message sequence resulting from the execution of the scenario. For example, if a plurality of terminals are involved in the automatic verification, the message sequence in the entire network may differ from the scenario even though the message sequence of the test result coincides with the scenario in each terminal. Furthermore, even with a single terminal, the resultant message sequence may differ from the scenario depending on the specification of the hardware and the operating system of the communication apparatus. Therefore, in this invention, the message group file shown in FIG. 12(a) is used as the standard system specification.

As shown in FIG. 12(a), in the message group file 58, messages O1 and O2 belong to group GRP1, and message O3 belongs to group GRP2. Since messages O1 and O2 belong to the same message group GRP1, the time order of these two messages cannot be inverted. However, the time order of one of these messages in GRP 1 and the message 35O3 belonging the different group GRP2 may be inverted.

Next, the scenario verification procedure will be explained in more detail.

(1) Group Data Preparation Procedure

Figure 12:
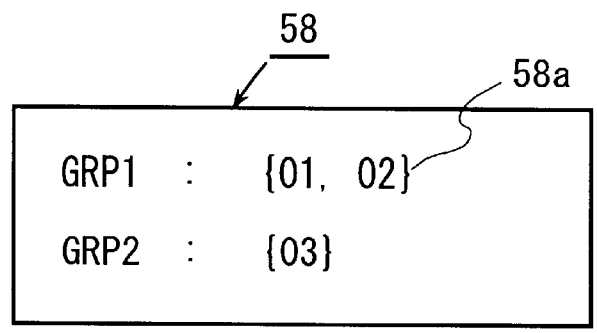
FIG. 12(a) illustrates a message group file.
FIG. 12(b) illustrates how the message group shown in FIG. 12(a) are recorded in the scenario recording unit.
Figure 12:
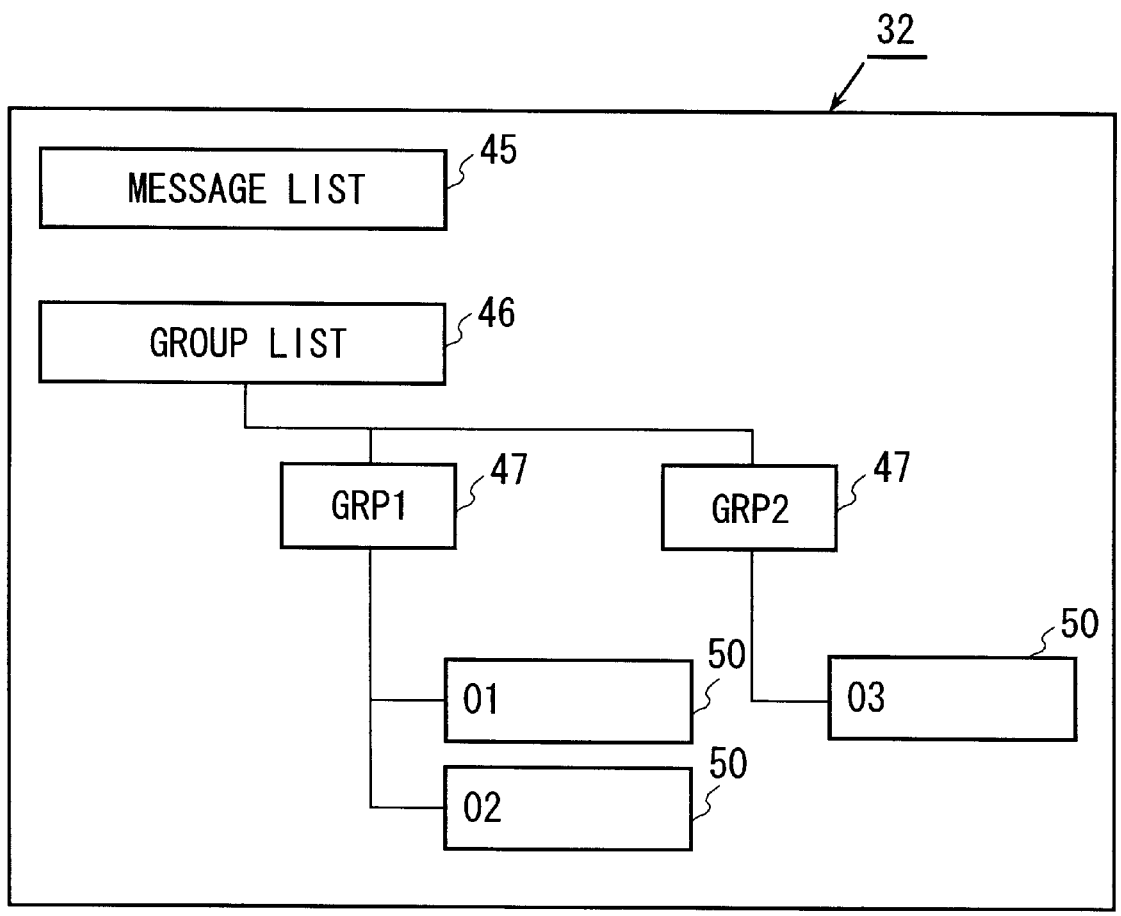

This procedure will be explained with reference to FIGS. 12 and 13. The group data preparation procedure is the process for recording the message group having the system specification shown in FIG. 12(a) in the scenario recording unit 32 in a form of the group list 46 shown in FIG. 12(b).

Figure 13:
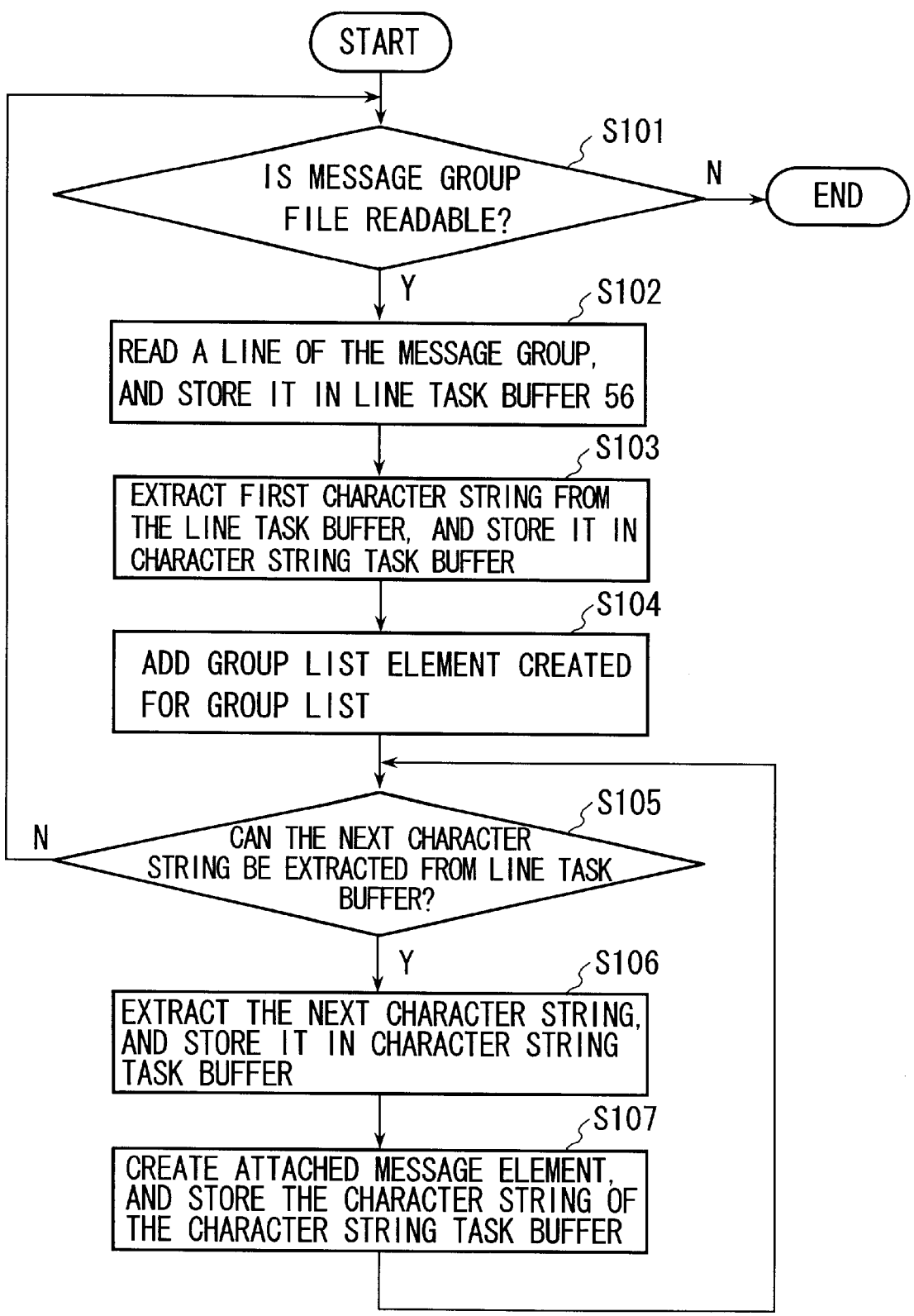
FIG. 13 is a flowchart showing the sequence of the group data preparation procedure.

FIG. 13 is a flowchart of the group data preparation procedure. First, it is determined if the message group can be read out from the message group file 58 (S101). If the message group file 58 is readable, a line of message group is read out, and stored in the line task buffer 56 (S102). If the message group file 58 is not readable, the process terminates.

For example, if the message group 58a shown in FIG. 12(a) is read out from the message group file 58, the message group 58a has a group ID of GRP1, and two attached messages O1 and O2. This message group 58a read out from the file 58 is stored in the line task buffer 56 (S102). Then, the first character string "GRP1" of this message group is taken out of the line task buffer 56, and is stored in the character string task buffer 57 (S103). Then, the group-list element 47 shown in FIG. 12(b) is created, in which the character string GRP1 stored in the character string task buffer 57 is stored, and this newly created group-list element 47 is added to the group list 46 (S104).

Then, it is determined if the next character string can be extracted from the line task buffer 56 (S105). If no character string is extracted, it is regarded that the line of message group has been processed. Accordingly, the process returns to S101, and the next line of message group is extracted from the message group file 58. The steps S101 through S104 are repeated until no message group is read out from the file 58. If the next character string can be extracted in S105, the next character string is stored in the character string task buffer 57 (S106).

Then, an attached message element 50 (FIG. 7) is created in order to store the character string O1 which was temporarily stored in the character string buffer 57 (FIG. 9), and this attached message element 50 is added to the attached message list 49 of the corresponding group list element 47 (S107). The steps S105 through S107 are repeated until no character string can be extracted from the message group 58a.

At this point of time, the process for the message group 58a is completed. The same process (S101 through S107) is executed for all of the message groups contained in the message group file 58.

When the group data preparation procedure is finished (i.e., when all the message groups have been processed), the data of the message group file 58 is categorized as the data of the group list 46 shown in FIG. 12(b), and is recorded in the scenario recording unit 32.

(2) Scenario Recording Procedure

In this procedure, the operation task of the virtual terminal is recorded as a scenario. FIG. 11(a) shows the message sequence recorded as a correct message order for executing the test. The operation task of the virtual terminal can be recorded by operating the virtual terminal 29 displayed on the display 9 using the keyboard 7 and the mouse 8, and communicating the message 35 with the communication software 3 through the virtual terminal manager 30. The message 35 communicated between the communication software 3 and the virtual terminal manager 30 is monitored by the scenario manager 31. If the virtual terminal 29 is activated, the scenario recording procedure starts, and the scenario is recorded in the scenario recording unit 32.

This procedure will be explained in more detail with reference to FIGS. 14 and 15. FIG. 15 is a flowchart of the scenario recording procedure. First, the timer 13 is initialized to 0 to start timing (S201). This procedure is continued until a recording stop command is generated. If, in S202, there is a recording stop command, the contents of the scenario recording unit 32 are stored in the scenario file (S208), and the process terminates.

If no recording stop command is generated in S202, a message communicated between the virtual terminal manager 30 and the communication software 3 is acquired (S203), and a verification message 39 is created based on the acquired message (S204). As shown in FIG. 6, the created verification message 39 contains a transmitter terminal ID 40, a receiver terminal ID 41, a message ID 42, a group ID 43, and a time 44. In the actual procedure, the transmitter ID 36, the receiver ID 37, and the message ID 38 of the acquired message 35 are stored as the transmitter terminal ID 40, the receiver terminal ID 41, and the message ID 42 of the verification message 39. In addition, the symbol "★" is stored as the group ID 43, and the time indicated by the timer 13 is stored as time 44. The reason why the symbol "★" is stored will be explained later.

Then, it is determined if the acquired message 35 is in the attached message elements 50 of the group list 46 (S205). If the acquired message is retrieved from the attached message elements 50, the group ID 48 of the group list 47, to which the retrieved message element 50 belongs, is stored as the group ID 43 of the created verification message 39 (S206). Thus, the previously stored symbol "★" is now replaced by the actual group ID which has been stored as the group ID 43. If the retrieval is not successful, the symbol "★" remains in the group ID 43 of the verification message 39. If the concrete group ID 43 is acquired after the retrieval, the created verification message 39 is added to the message list 45 (S207).

Figure 14:
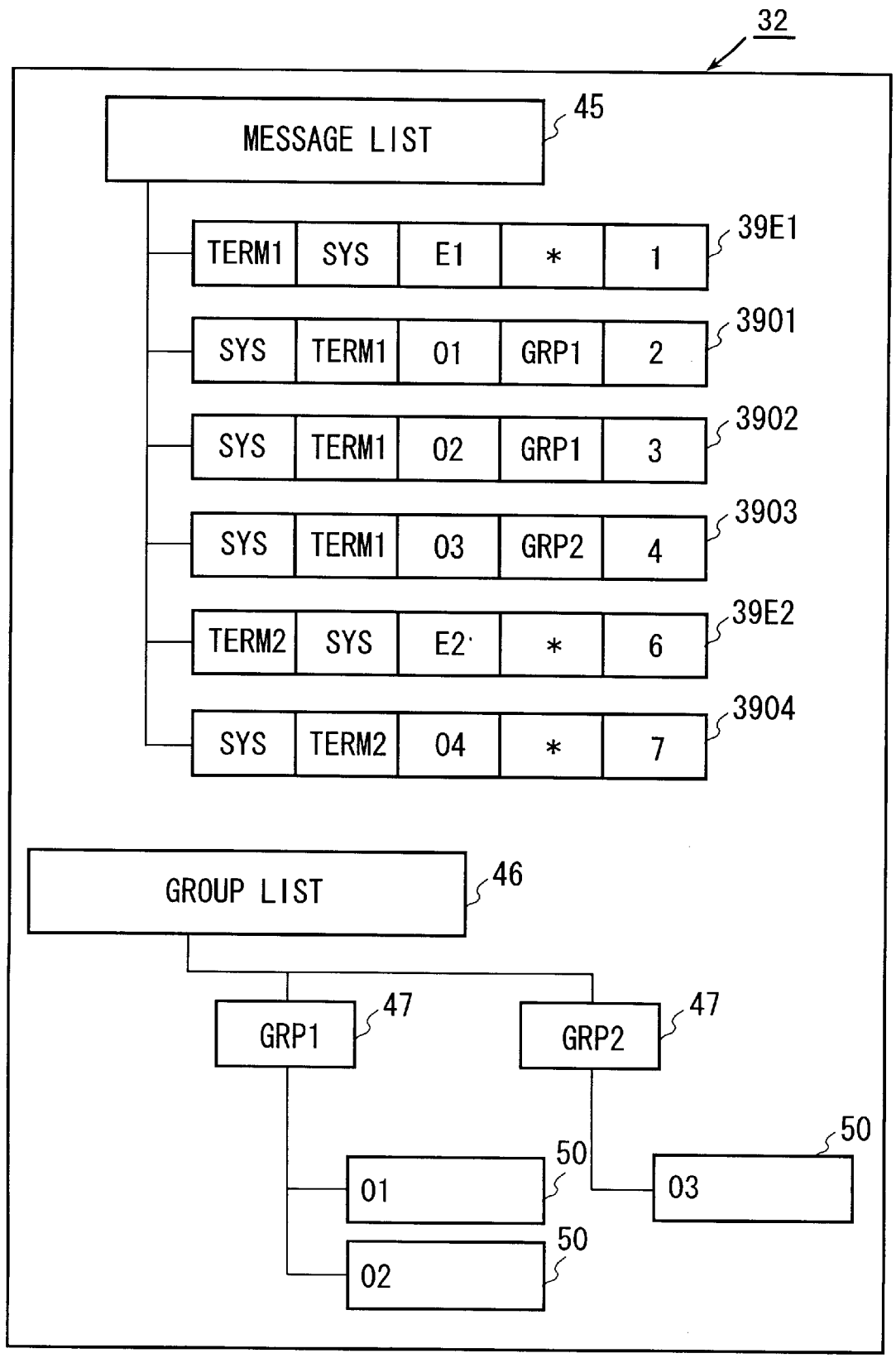
FIG. 14 shows the recording sequence of the scenario recording unit.
Figure 15:
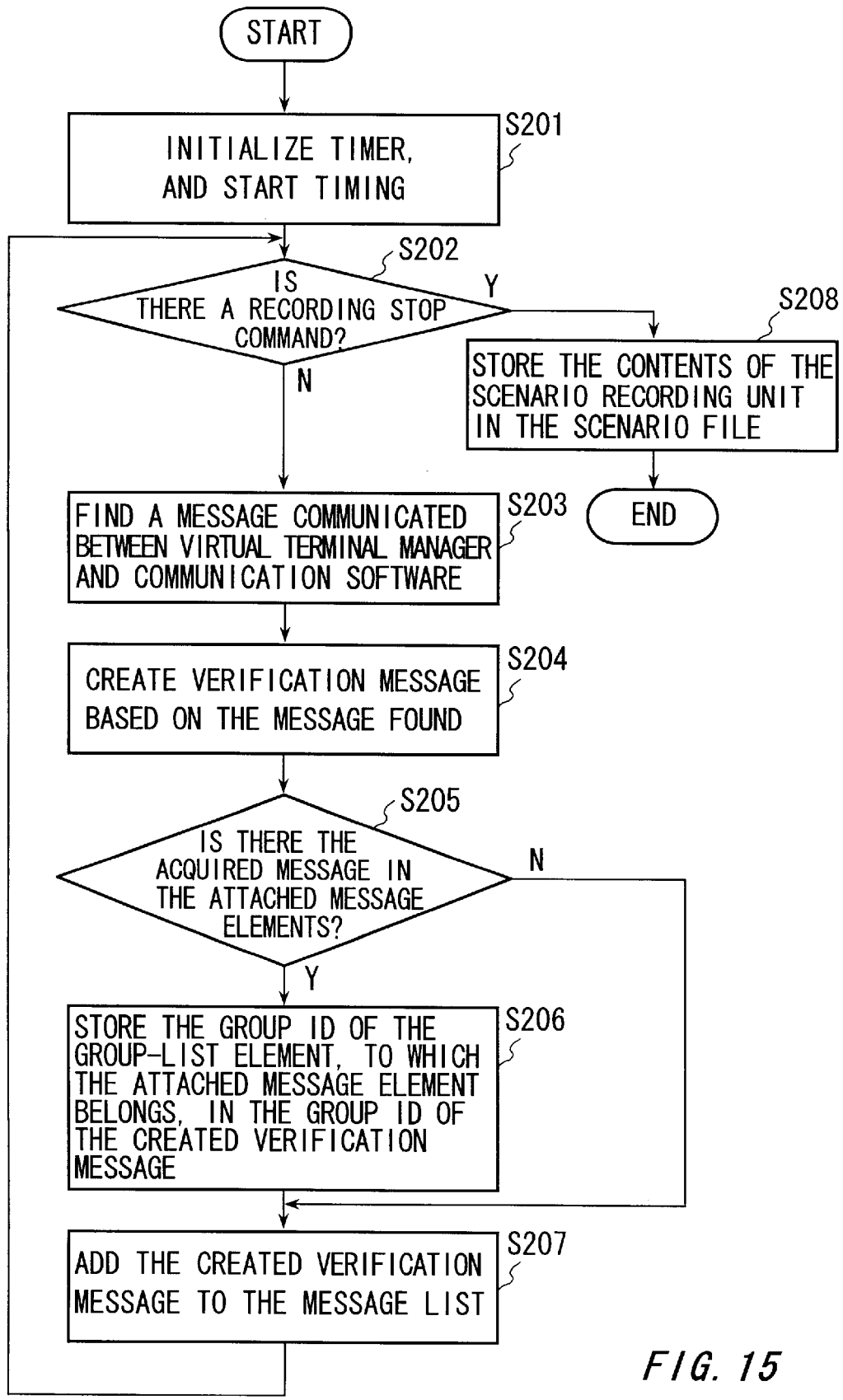
FIG. 15 is a flowchart showing the sequence of the scenario recording procedure.

In the example shown in FIG. 14, the message ID "O1" is included in the attached message elements 50 of the group list 46. Accordingly, the group ID GRP1 of the group-list element 47, to which the corresponding attached message elements 50 belong, is stored as the group ID of the created verification message 39O1, instead of the symbol "★". On the other hand, because the message ID E2 of the message 35E2 is not included in the attached message elements 50 of the group list 46, the group ID of the verification message 39E2 remains "★".

The above-described procedure is repeated until a recording stop command is generated. Upon the generation of the recording stop command, the contents of the scenario recording unit 32 are stored in the scenario file 59 (S208), and the process terminates. The scenario file 59 is not referred to during the message verification procedure. FIG. 14 illustrates the structure of the scenario recording unit 32 after the scenario recording procedure has been completed.

(3) Verification Preparation Procedure

The message preparation procedure is a process for grouping the verification messages 39 for each terminal, which is performed prior to the actual verification. This procedure will be explained with reference to FIGS. 16 and 17.

Figure 17:
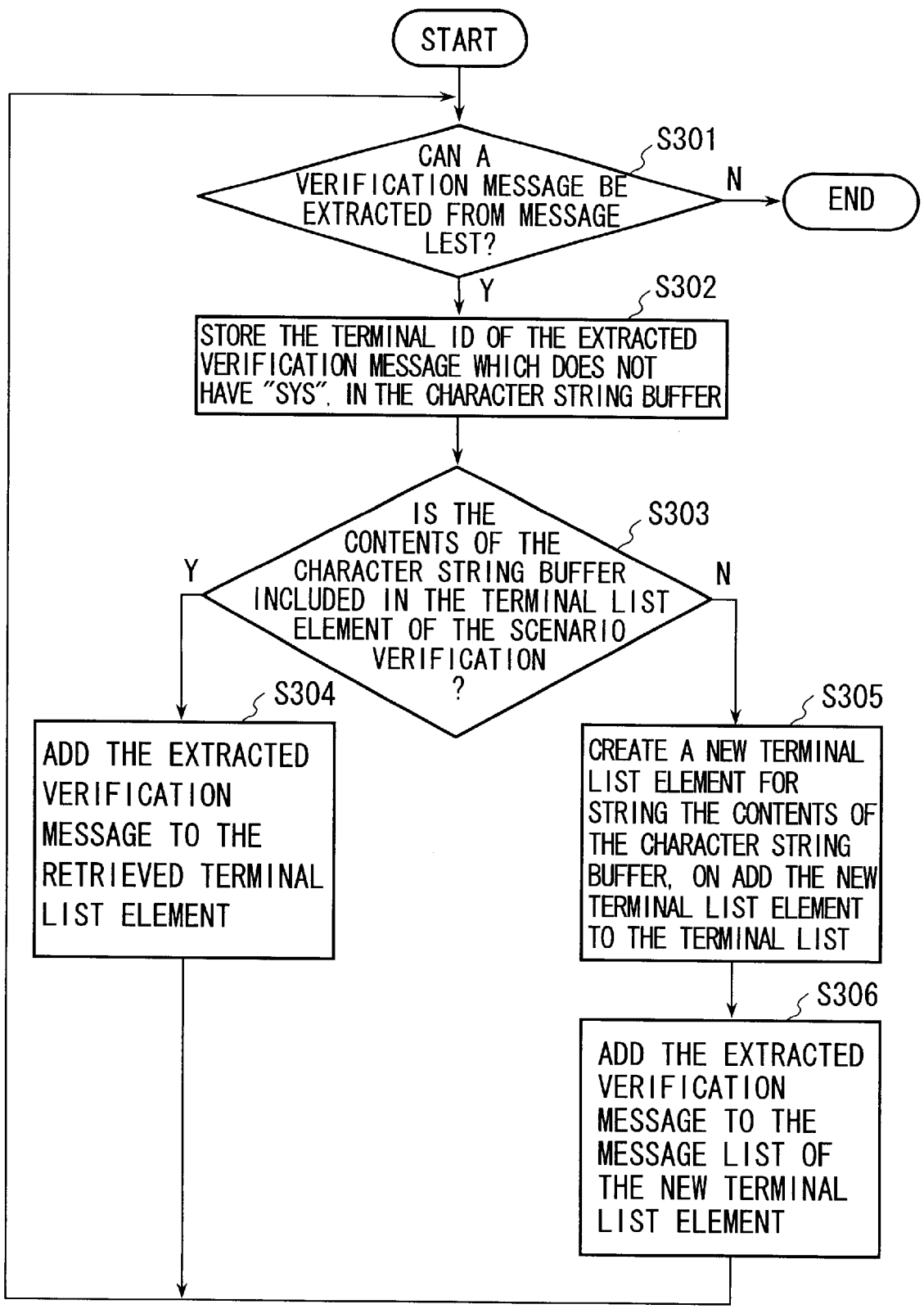
FIG. 17 is a flowchart showing the sequence of the verification preparation procedure.

FIG. 17 is a flowchart of the verification preparation procedure. First, it is determined if a verification message 39 can be extracted from the message list 45 of the scenario recording unit 32 (S301). If YES, a verification message 39 is extracted, and steps S302 through S306 are executed for the extracted message. This step (S301) is repeated until no more verification messages 39 are extracted.

Each verification message 39 includes a transmission terminal ID 40 and a receiving terminal ID 41, only one of which stores information "SYS" which represents the communication software 3. Among these two terminal IDs, one which does not have "SYS" is extracted and stored in the character string task buffer 57 for each of the extracted verification messages 39 (S302). For example, in the verification message 39E1, the receiving terminal ID 41E1 bears "SYS", and therefore, the transmission terminal ID 40E1 (that is, "Term 1") is extracted and stored in the character string task buffer 57.

Then, it is determined for the extracted verification messages 39 if the contents of the character string task buffer 57 are included in the terminal list elements 53 of the terminal message list 52 stored in the scenario verification unit 34 (S303). If a corresponding terminal list element is retrieved, the extracted verification message 39 is added to the terminal message list 55 of the retrieved terminal list element 53 (S304).

If a corresponding terminal list element is not retrieved in S303, a new terminal list element 53 is created, and the contents of the character string task buffer 57 are stored in the new element (S305). Then, this new terminal list element 53 is added to the terminal list 52, and the extracted verification message 39 is added to the message list of the newly added terminal list element 53 (S306).

Figure 16:
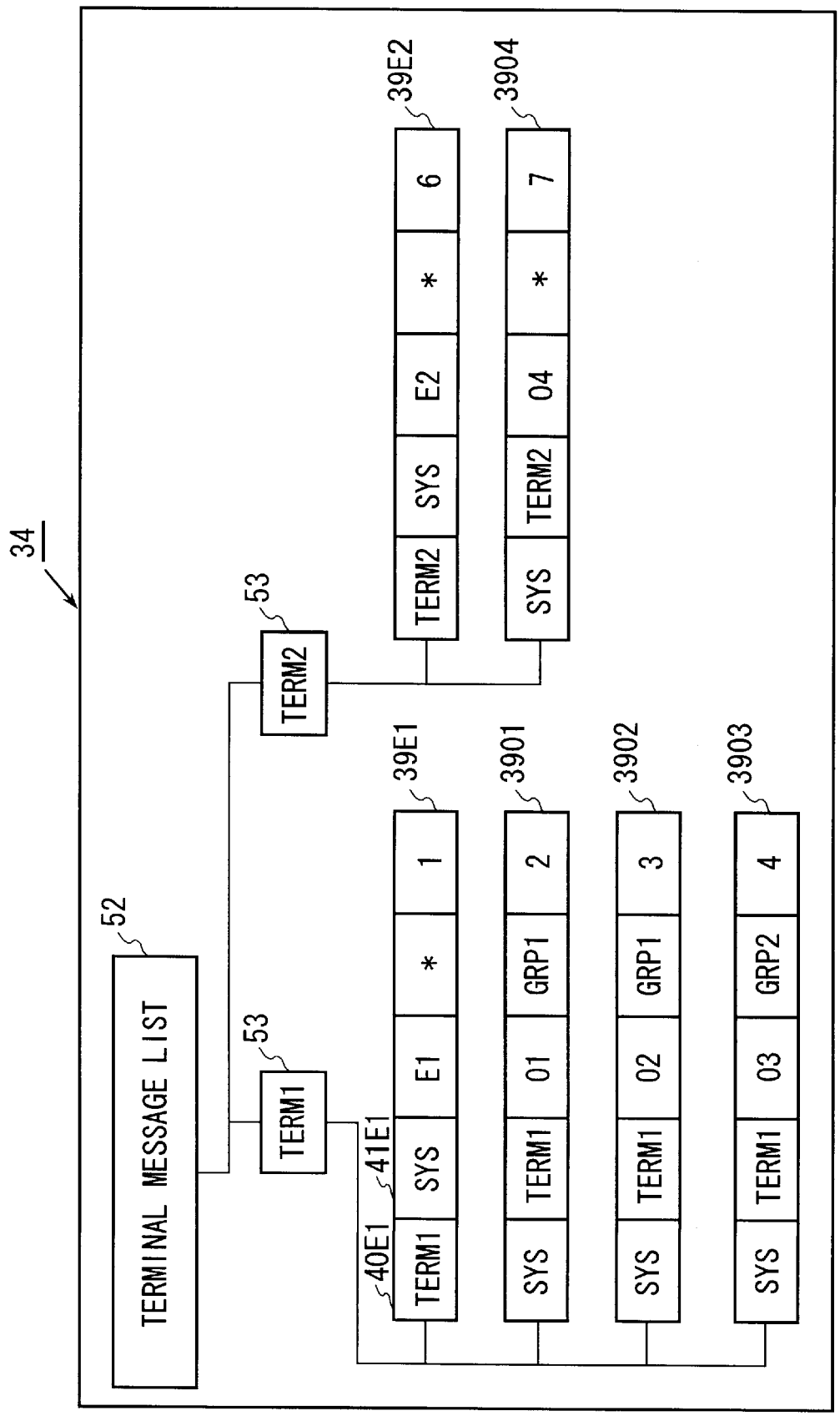
FIG. 16 illustrates the scenario verification unit.

For example, in FIG. 16, the contents of the character string task buffer 57 for the verification message 39E2 is "Term2", which is not included in the terminal list elements 53 of the terminal list 52 of the scenario verification unit 34. Therefore, a new terminal list element 53 is created, in which the contents of the character string buffer 57 (i.e., "Term2") are stored. Then, the new terminal list element 53 is added to the terminal list 52, and the extracted verification message 39E2 is added to the message list 55 of the newly added terminal list element 53.

The steps 301 through 306 are repeated until there is no verification message 39 left in the scenario recording unit 32. The scenario verification unit 34 now has a structure shown in FIG. 16 after the completion of the verification preparation procedure.

(4) Message Verification Procedure

Figure 22:
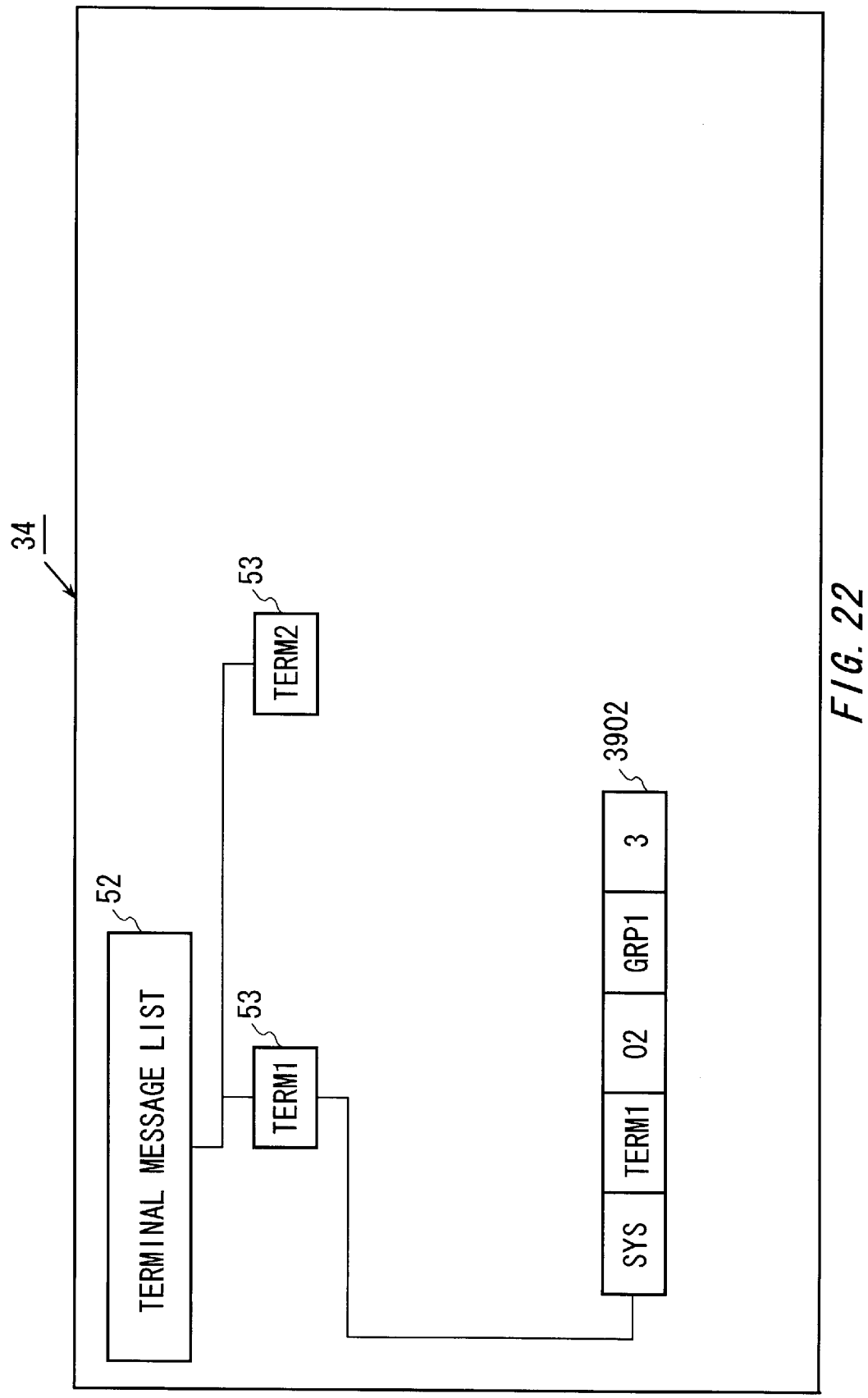
FIG. 22 illustrates the state of the scenario verification unit after message O4 has been received.
Figure 23:
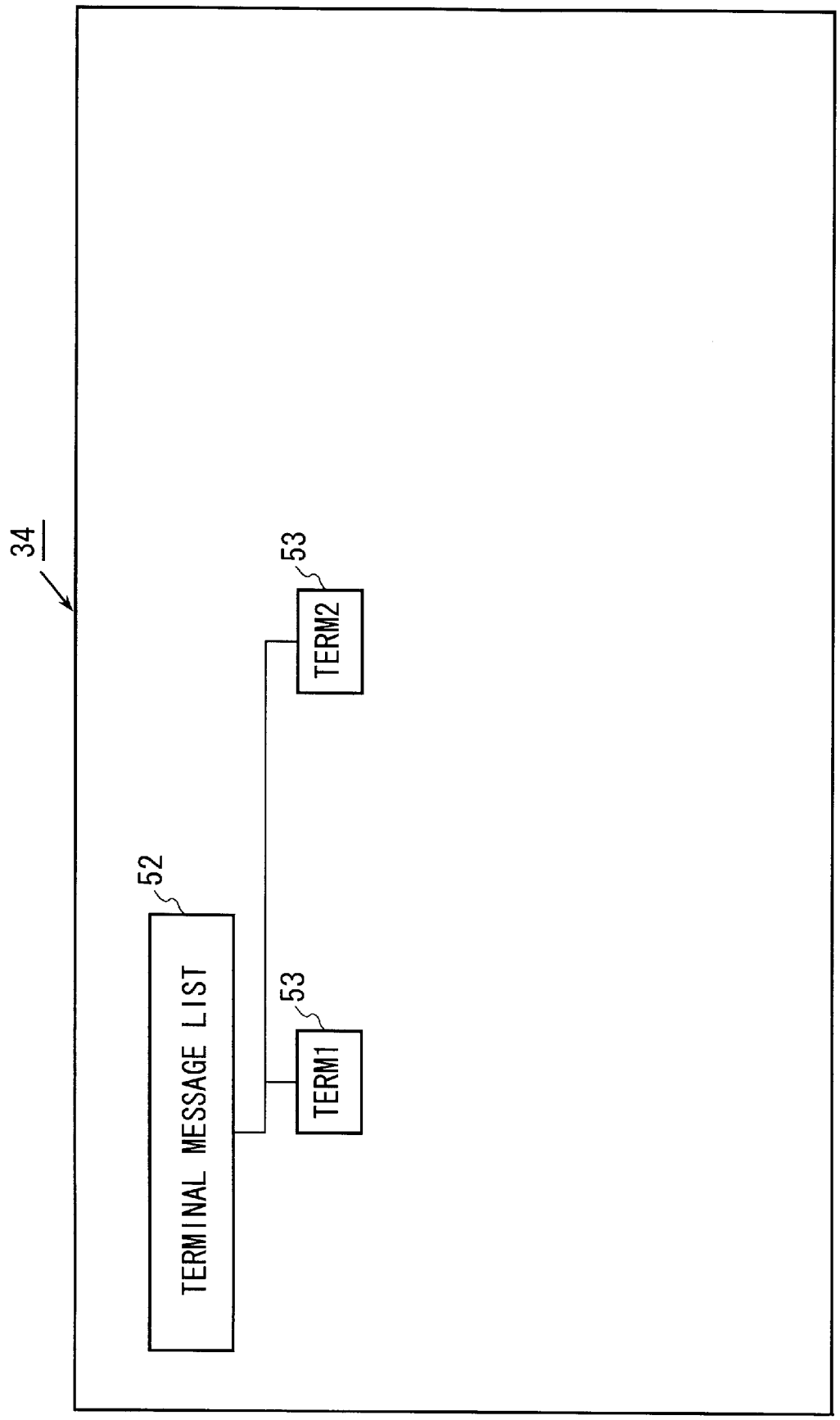
FIG. 23 illustrates the state of the scenario verification unit after message O2 has been received.
Figure 24:
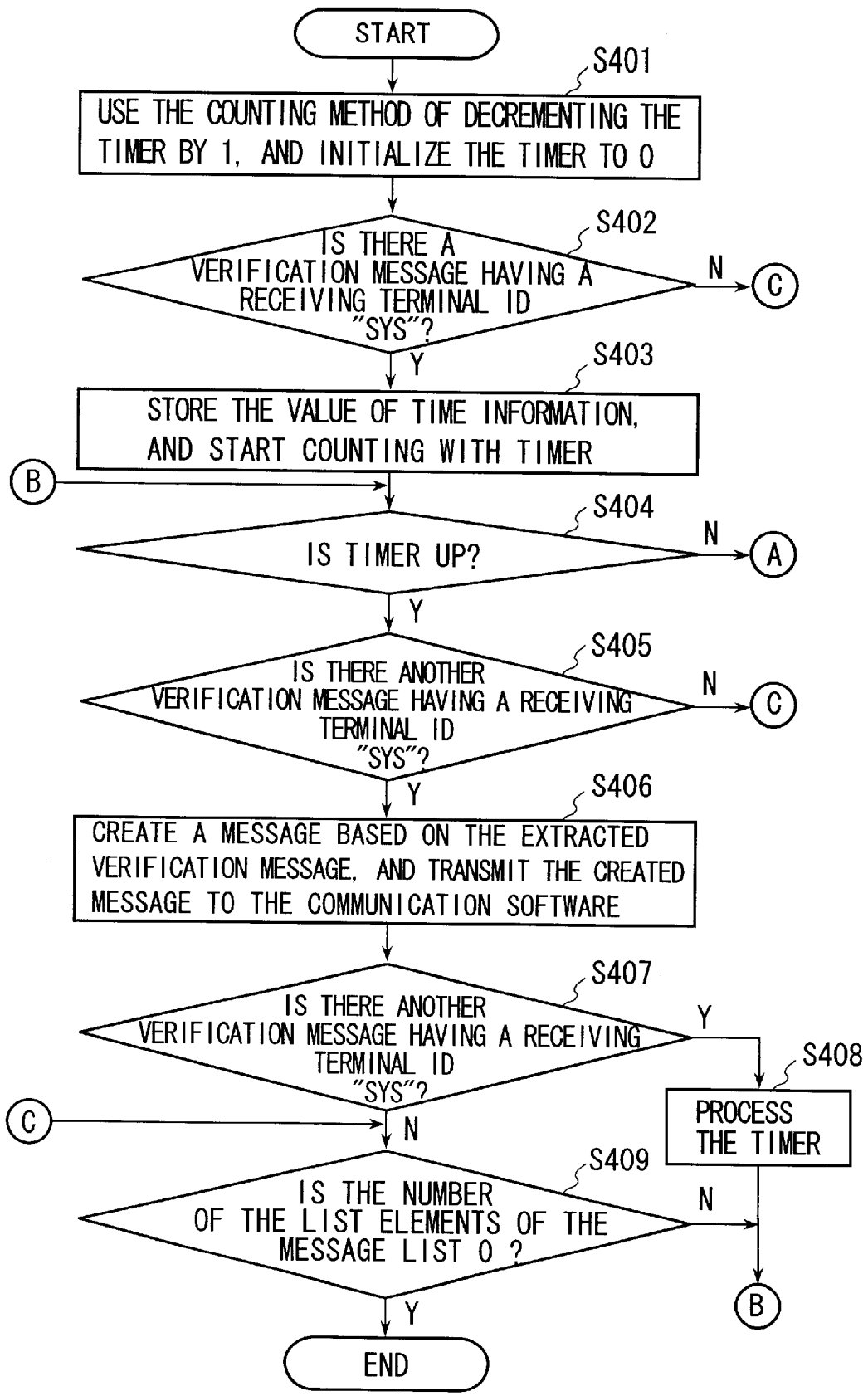
FIGS. 24 and 25 are flowcharts showing the sequence of the message verification procedure.
Figure 25:
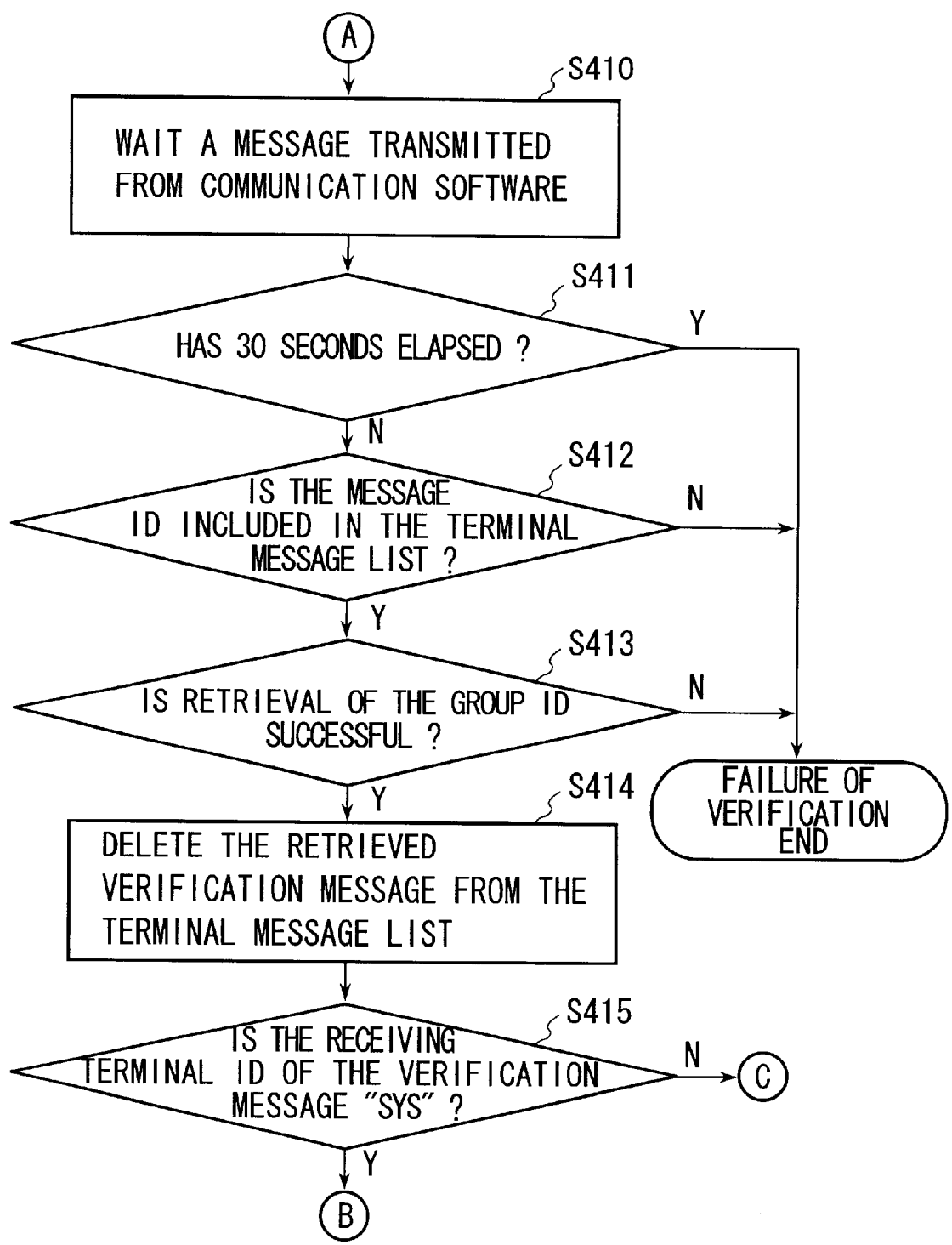

Finally, the test result is actually verified through the message verification procedure, which will be explained with reference to FIG. 16 and FIGS. 18 through 25. FIGS. 24 and 25 are flowcharts of the message verification procedure. In this procedure, a prescribed time for retrieving the verification message 39 is counted using a timer 13. The time is counted by decrementing the timer value by one until the value becomes 0. The minimum timer value is 0, and therefore, the timer value remains at 0 once the timer is up. At the beginning of the message verification procedure, the timer 13 is initialized to 0 (S401).

A time for waiting the message is counted by a time-out counter 14. In this embodiment, the time-out is set to 30 seconds. The time-out counter 14 is set to 0 if the process enters the message waiting state. If 30 seconds has passed, the time-out information is supplied to the CPU 11 which executes the message-verification procedure.

After the initialization of the timer, it is determined if there is a verification message 39 having a receiving terminal ID 41 with "SYS" in the message list 55 of the scenario verification unit 34 (S402). If such a verification message 39 is found, the value of time 44 contained in that message 39 is stored in the timer 13, and the timer 13 starts counting (S403). In the example shown in FIG. 16, the verification message 39E1 has a receiving terminal ID bearing "SYS", and therefore, the value "1" of the time 44E1 of this message is stored in the timer 13. If no such messages are found in S402, the process proceeds to S409, in which it is determined if the number of the list elements of the terminal message list 52 is zero. If the number of the list elements is zero, it is regarded as a success of the verification, and the process terminates. If the number of the list elements is not zero, the process returns to S404.

In S404, it is determined if the value of the timer is zero. If the timer value is not 0, the process jumps to S410, which will be described below. If the timer value is 0, it is determined if there is a verification message 39 having a receiving terminal ID 41 with "SYS" in the message list 55 of the scenario verification unit 34 (S405).

Figure 18:
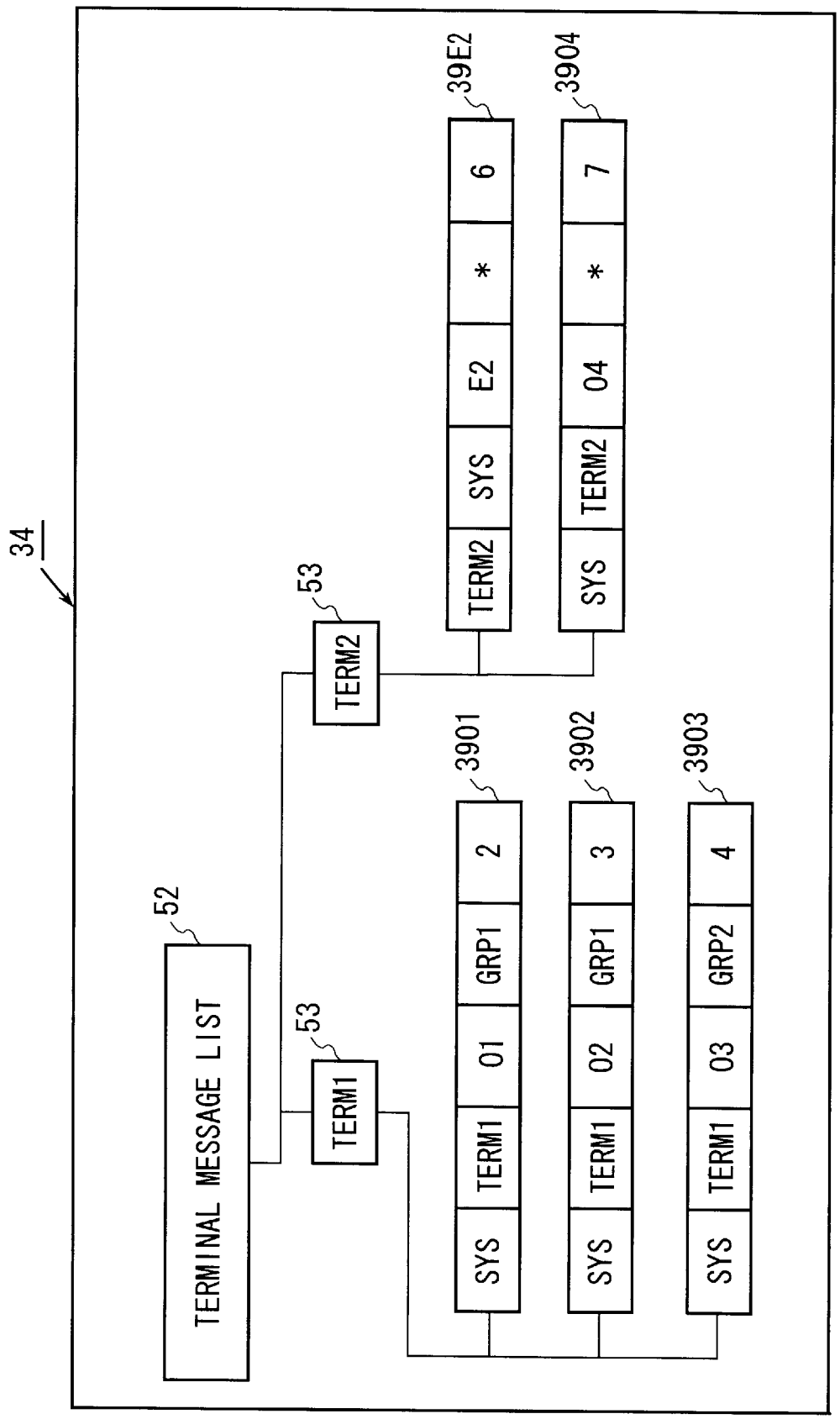
FIG. 18 illustrates the state of the scenario verification unit after message E1 has been transmitted.

If a verification message 39 having a receiving terminal ID 41 with "SYS" is found, this verification message 39 is taken out of the message list 55, a message 35 is created based on this verification message 39, and the created message 35 is transmitted to the communication software 3 (S406). At this point of time, the message 39E1 is removed from the terminal message list 52 of the scenario verification unit 34, as shown in FIG. 18. If no verification message having a receiving terminal ID 41 with "SYS" is found in S405, the process jumps to S409, the operation of which has been described above.

In S407, it is again determined if there is a verification message 39 having a receiving terminal ID 41 with "SYS" in the message list 55 of the scenario verification unit 34. If such a message 39 is found, the value of the time 44 of the verification message extracted in S406 is subtracted from the value of the time 44 of the verification message 39 newly found in S407, and the subtraction result is stored in the timer 13 (S408). Then, the process returns to S404, in which it is determined if the timer value is 0.

If the timer value is not 0 in S404, the process jumps to S410, in which a message 35 transmitted from the communication software 3 is waited. However, if the time-out counter 13 is up (that is, if 30 seconds has passed), it is regarded as a failure of the verification because the message-waiting time is over, and the process terminates (S411).

If a message 35 is transmitted from the communication software 30 within 30 seconds, then it is determined if the message ID 38 of the transmitted message 35 is included in the message list 55 (S412). This step is referred to as retrieval A. If no corresponding ID is retrieved from the message list 55, the transmitted message is regarded as an unexpected message (i.e., a failure of the verification, and the process terminates).

Then, it is determined if there is another verification message 39 having the same group ID as the group ID 43 of the verification message retrieved in S412 (retrieval A) among those elements listed in the message list 55 before the retrieved message 39 (S413). This step is referred to as retrieval B. If another verification message having the same group ID is found at the position before the retrieved message 39, it is regarded as "an error in the message order in the group", and therefore, as a failure of the verification. In this case, the process terminates.

If there is no other verification message 39 having the same group ID in S413 (retrieval B), the verification message 39 retrieved in S412 (retrieval A) is deleted from the message list 55 (S414). After the deletion, it is determined if the receiving terminal ID 41 of the next verification message 39, which is now listed at the top of the list as a result of the deletion of the previous message 39, is "SYS" (S415). If YES in this determination, the process returns to S404. If NO in the determination, the process returns to S409.

If no verification message 39 is left in the message list 55, the message verification procedure is completed. FIG. 16 and FIGS. 18 through 23 illustrate the states of the scenario verification unit 34 during the message verification procedure.

Figure 19:
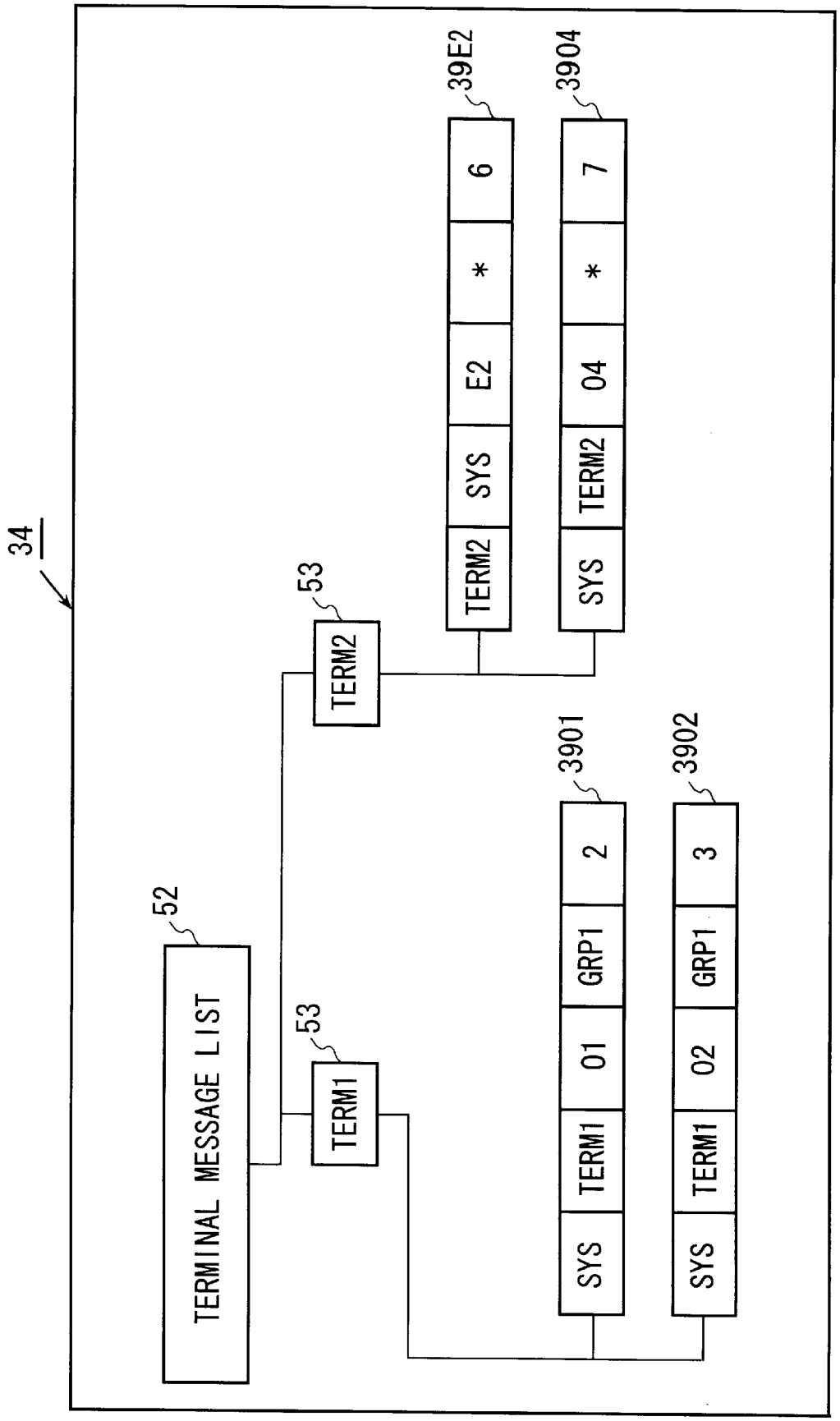
FIG. 19 illustrates the state of the scenario verification unit after message O3 has been received.
Figure 20:
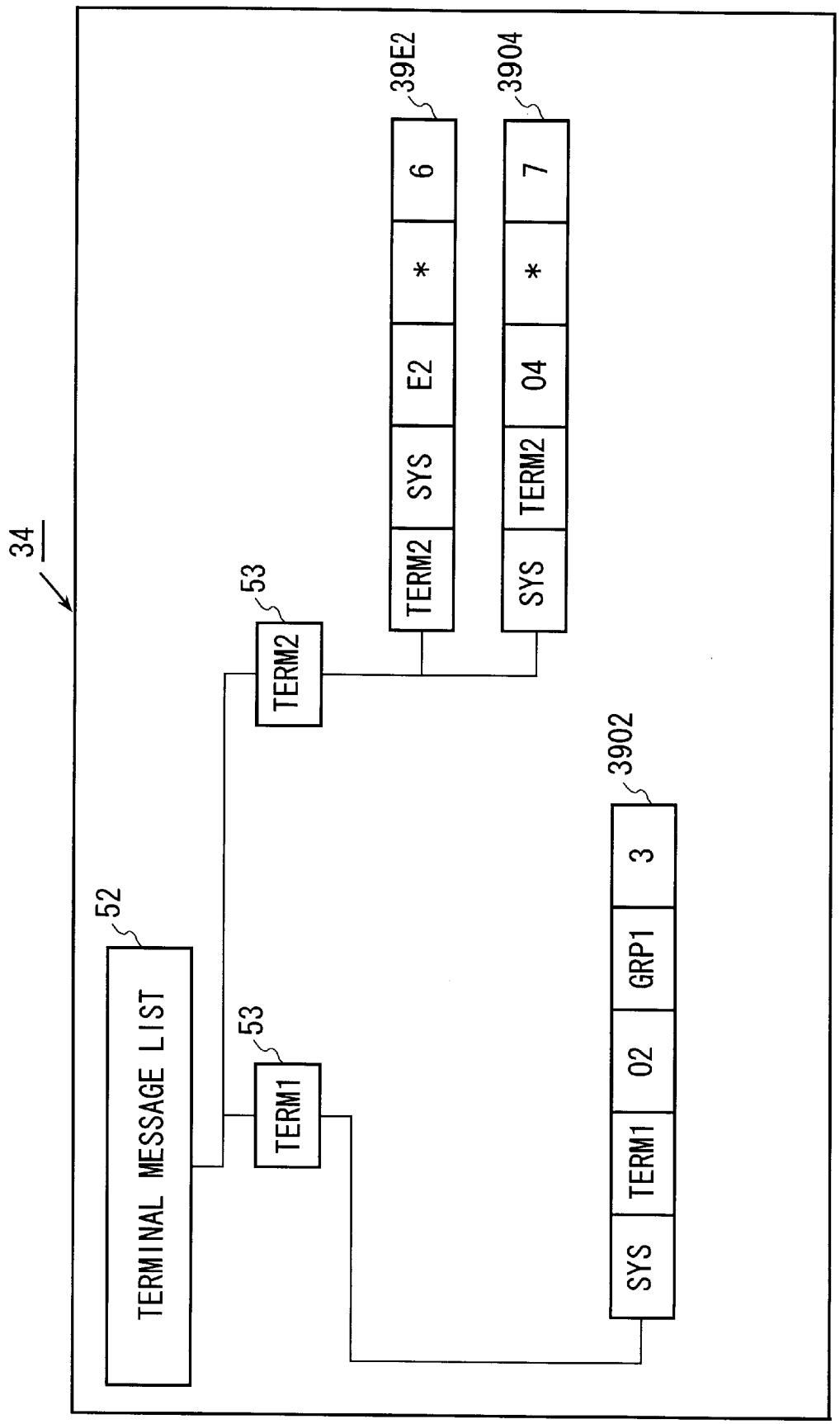
FIG. 20 illustrates the state of the scenario verification unit after message O1 has been received.
Figure 21:
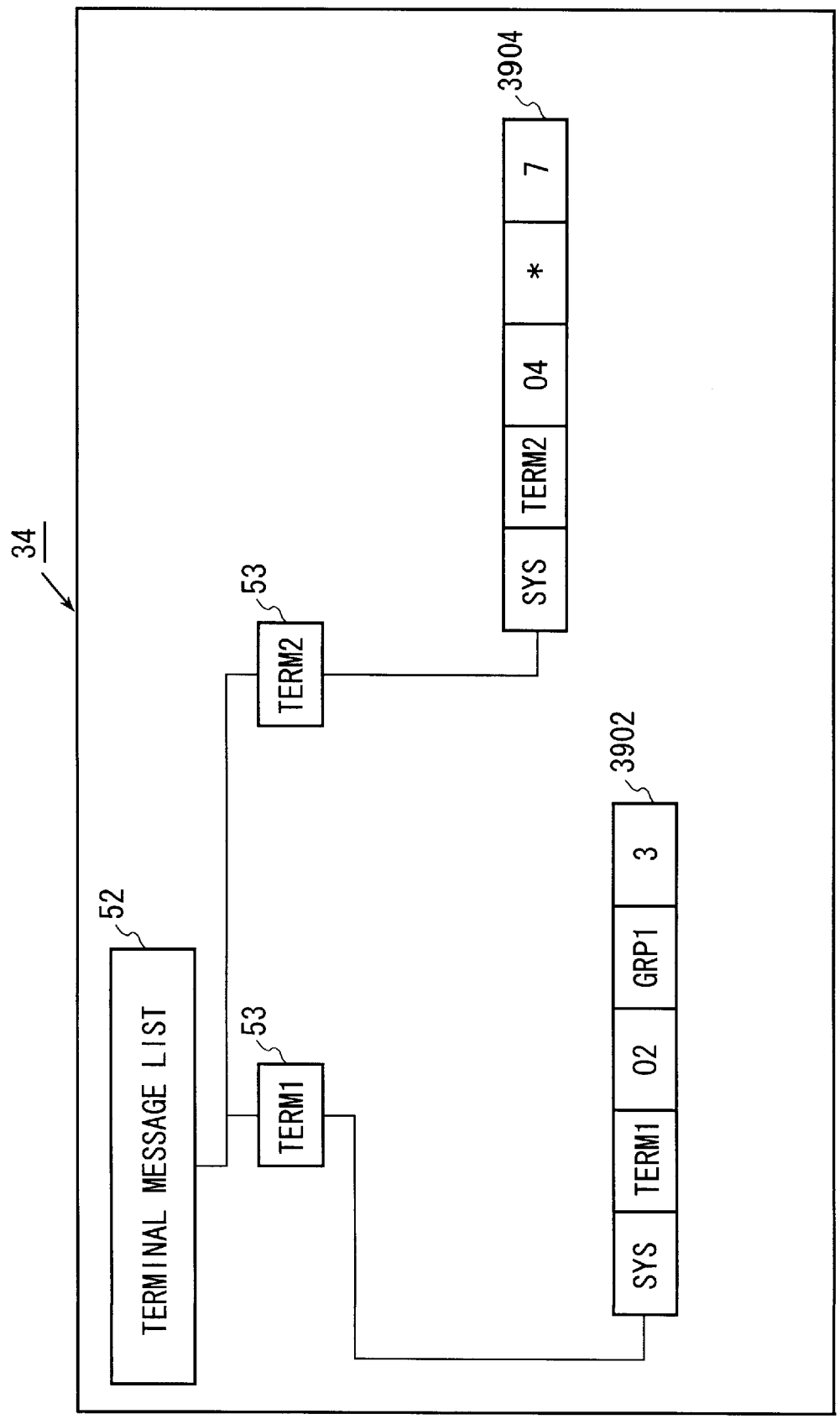
FIG. 21 illustrates the state of the scenario verification unit after message E2 has been received.

FIG. 18 shows the state immediately after the message 39E1 was transmitted to the communication software 3. FIG. 19 shows the state immediately after the message 39O3 was received by the scenario verification unit 34. FIG. 20 shows the state immediately after the message 39O1 was received by the scenario verification unit 34. FIG. 21 shows the state immediately after the message 39E2 was transmitted to the communication software 3. FIG. 22 shows the state immediately after the message 39O4 was received by the scenario verification unit 34. FIG. 23 shows the state immediately after the message 39O2 was received by the scenario verification unit 34.

As has been described above, in the preferred embodiment, (1) the functional element for performing a pseudo-operation of a terminal connector is the virtual terminal manager 30 of the test execution software 28, (2) the functional element for performing a pseudo-operation of a terminal is the virtual terminal 29, and (3) the functional element for recording the pseudo-operation performed by the virtual terminal as a scenario is the group data preparation procedure and the scenario recording procedure executed by the scenario manager 31 and the scenario recording unit 32. In addition, (4) the functional element for automatically executing the recorded pseudo-operation of the terminal, and (5) the functional element for automatically verifying if the automatic execution result is correct whenever the recorded pseudo-operation of the terminal is automatically executed, are simultaneously embodied by the verification preparation procedure and the message verification procedure executed by the scenario manager 31, the scenario executing unit 33, and the scenario verification unit 34.

These functions can eliminate the necessity of manually operating each terminal for the regression test, which was required in the conventional art, and the work efficiency of the regression test can be improved.

In addition, the test result of the terminal operation can be automatically verified.

Although the present invention has been described based on the preferred embodiment, the invention is not limited to this embodiment. It is apparent for those skilled in the art that there are many changes and substitutions within the spirit and the scope of the invention, which are defined by the attached claims.

What is claimed is:

1. An automatic verification apparatus for communication software, comprising:

a virtual terminal manager for performing a pseudo-operation of a terminal connector;

one or more virtual terminals, each performing a pseudo-operation of a terminal;

a scenario recording unit for recording the pseudo-operation performed by each virtual terminal as a scenario;

a scenario executing unit for automatically executing the recorded pseudo-operation of the terminal; and a scenario verification unit for automatically verifying if the result of the automatic execution is correct whenever the recorded pseudo-operation of the terminal is automatically executed.

2. The automatic verification apparatus for communication software according to claim 1, further comprising a scenario manager for managing each scenario as a message which includes at least a transmission terminal ID, a receiving terminal ID, and a message ID.

3. The automatic verification apparatus for communication software according to claim 2, wherein when the result of the automatic execution of the scenario is verified, said message is managed as a verification message which further includes a group ID and a time.

4. The automatic verification apparatus for communication software according to claim 3, wherein the scenario verification unit has a terminal list for managing a plurality of terminal IDs, each as a terminal list element, said terminal list element managing the verification messages in time series.

5. The automatic verification apparatus for communication software according to claim 3, wherein the scenario executing unit includes a line task buffer which is capable of storing a line of a message group, and a character string task buffer which is capable of storing a character string of the message group.

6. The automatic verification apparatus for communication software according to claim 1, wherein the scenario recording unit includes a message list for managing a plurality of verification messages in time series, and a group list containing a plurality of group-list elements, each element having a group ID, and wherein each of the group-list elements manages a plurality of attached message elements, each having a message ID, in time series.

7. The automatic verification apparatus for communication software according to claim 6, wherein the scenario verification unit has a terminal list for managing a plurality of terminal IDs, each as a terminal list element, said terminal list element managing the verification messages in time series.

8. The automatic verification apparatus for communication software according to claim 6, wherein the scenario executing unit includes a line task buffer which is capable of storing a line of a message group, and a character string task buffer which is capable of storing a character string of the message group.

9. A method for automatically verifying operations of communication software, comprising the steps of:

performing a pseudo-operation of a terminal connector;

performing a pseudo-operation of a terminal;

recording the pseudo-operation of the terminal as a scenario;

automatically executing the recorded pseudo-operation of the terminal; and automatically verifying if the result of the automatic execution is correct whenever the recorded pseudo-operation of the terminal is automatically executed.

10. The method according to claim 9, wherein the scenario is managed as a message which includes at least a transmission terminal ID, a receiving terminal ID, and a message ID.

11. The method according to claim 10, wherein said message is managed as a verification message which further includes a group ID and a time.

12. The method according to claim 11, wherein the scenario recording step includes a group data preparation step for managing a message group of the scenario, and a scenario recording step for recording the scenario in a scenario file.

13. The method according to claim 11, wherein the automatic execution step and the automatic verification step include a verification preparation step for grouping the verification messages, each group for one of the terminals, and a message verification step for determining if the verification messages of a message group have been transmitted and received in the correct order in time series.

* * * * *